US007742196B2

(12) United States Patent
Uchida et al.

(10) Patent No.: US 7,742,196 B2
(45) Date of Patent: Jun. 22, 2010

(54) INFORMATION PROCESSING APPARATUS AND METHOD FOR PROCESSING INFORMATION

(75) Inventors: Tatsuro Uchida, Yokohama (JP); Hiroshi Oomura, Yokohama (JP); Yoshihiro Takagi, Yokohama (JP); Masanori Aritomi, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1200 days.

(21) Appl. No.: 11/037,343

(22) Filed: Jan. 19, 2005

(65) Prior Publication Data

US 2005/0174596 A1 Aug. 11, 2005

(30) Foreign Application Priority Data

Jan. 23, 2004 (JP) ............................. 2004-016398
Jan. 14, 2005 (JP) ............................. 2005-008186

(51) Int. Cl.
*H04N 1/40* (2006.01)
*H04N 1/60* (2006.01)

(52) U.S. Cl. ....................................... 358/3.28; 358/1.9

(58) Field of Classification Search .................. 358/1.9, 358/3.28, 1.18, 515, 1.1, 1.2, 1.5, 1.6, 1.11, 358/1.13, 1.14, 1.15, 501, 538, 540, 401, 358/437; 382/175, 100, 135, 174; 715/273, 715/274
See application file for complete search history.

(56) References Cited

U.S. PATENT DOCUMENTS

| | | | | |
|---|---|---|---|---|
| 4,736,310 | A * | 4/1988 | Colthorpe et al. | 358/515 |
| 5,146,554 | A * | 9/1992 | Statt | 358/3.13 |
| 5,788,285 | A | 8/1998 | Wicker | |
| 6,000,728 | A | 12/1999 | Mowry, Jr. | |
| 7,131,775 | B2 * | 11/2006 | Uchida et al. | 400/62 |
| 2001/0034773 | A1 | 10/2001 | Kujirai | |
| 2003/0142140 | A1 * | 7/2003 | Brown et al. | 345/803 |
| 2005/0206916 | A1 | 9/2005 | Nakagiri | |

FOREIGN PATENT DOCUMENTS

| | | | |
|---|---|---|---|
| JP | 07-044338 | | 2/1995 |
| JP | 2000-020271 | | 1/2000 |
| JP | 2001-134408 | | 5/2001 |
| JP | 2001-197297 | A | 7/2001 |
| JP | 2001-324898 | A | 11/2001 |
| JP | 2003-032487 | | 1/2003 |

* cited by examiner

*Primary Examiner*—Dov Popovici
(74) *Attorney, Agent, or Firm*—Fitzpatrick, Cella, Harper & Scinto

(57) ABSTRACT

An information processing apparatus specifies an area wherein a tint block image is applied, or an area wherein a tint block is not applied. A user selects either an application mode or a non-application mode in an area 2250 to specify a tint block application area or a tint block non-application area, and selects, in an area 2251, a shape for a tint block application area or a tint block non-application area. Then, the user employs, for example, a mouse to adjust the size and the location of the selected figure, and specifies the tint block application area or the tint block non-application area. The printer driver employs the selected area information to generate tint block application/non-application area information, and employs this information to create tint block image data while taking into account the area.

9 Claims, 31 Drawing Sheets

FIG.20A
FIG.20D
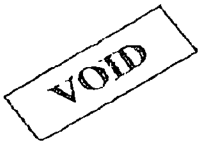
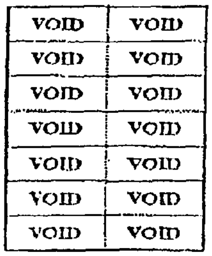
FIG.20B
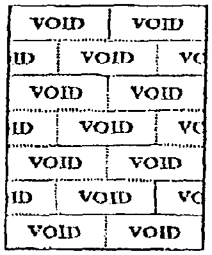
FIG.20C
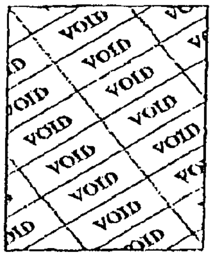
FIG.20E
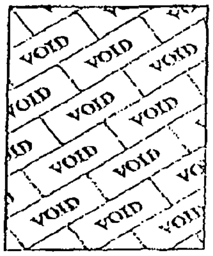
FIG.20F

| INTERFACE NAME | FUNCTION |
|---|---|
| ·Start Edit Secure Mark( ) | START TINT BLOCK EDITING |
| ·End Edit Secure Mark( ) | END TINT BLOCK EDITING |
| ·Adapt All Area( ) | ADD TINT BLOCK PATTERN TO ENTIRE AREA |
| ·Erase All Area( ) | ERASE TINT BLOCK PATTERN FROM ENTIRE AREA |
| ·Set Secure Mark Mode( ) | SPECIFY TINT BLOCK EDITING MODE (ADAPT: APPLICATION MODE, ERASE:NON-APPLICATION) |
| ·Draw Pectangle(...) | SPECIFY RECTANGULAR AREA |
| ·Draw Poiygon(...) | SPECIFY POLYGONAL AREA |
| ·Draw Elips(...) | SPECIFY ELLIPTICAL AREA |
| ⋮ | ⋮ |

FIG.21

WITHOUT CAMOUFLAGE

WITH CAMOUFLAGE

INFORMATION PROCESSING APPARATUS AND METHOD FOR PROCESSING INFORMATION

BACKGROUND OF THE INVENTION

1. Field of the Invention

The present invention relates to an information processing apparatus and a method for processing information, and more specifically, to processing executed for printing an image including a tint block image, which restrains people from using duplicates and the like, in a system configured by having the information processing apparatus, such as a personal computer, and the printing apparatus, such as a printer.

2. Description of the Related Art

Conventionally, in order to prohibit copying a ledger sheet, a resident card, and the like, or restrain people from doing so, papers on which special printing is given, papers called anti-counterfeit paper have been used. The anti-counterfeit paper is a paper in which characters or the like such as "COPY" is embedded to be hard to recognized by a human eye when the paper is in a state of an original and to show up on the copied paper when the original is copied using a copying machine or the like. Thereby, people can visually distinguish a print sheet as the original from the duplicate made by copying the original, easily. The use of this anti-counterfeit paper as an original causes those who copy the original to hesitate to use duplicated papers. Moreover, the anti-counterfeit paper gives a mental restraint effect of inhibiting an act of copying itself. The reason why characters in the original of the anti-counterfeit paper needs to be hard for people to recognize is to enable people to distinguish between the original and the duplicate definitely. If characters such as "COPY" is recognizable to such an extent that people can clearly recognize it even in the original, there may occur the possibility that people recognize it as the duplicate and such paper does not make a sense as the anti-counterfeit paper. Wicker (U.S. Pat. No. 5,788,285) and Mowry et al. (U.S. Pat. No. 6,000,728) disclose arts for manufacturing such an anti-counterfeiting paper.

On the other hand, as various contents are being digitized, the contents of ledger sheets, a resident card, or the like are being transformed into digital data similarly However, digitization for handling of these ledger sheets and resident cards, such as use of these documents, is still in a transition phase. Consequently, the contents of digital data formed using a computer is likely to be outputted on papers with a printer or the like for subsequent use.

Under such circumstances, significant improvement in printer performance has been achieved in recent years, and this is one of cause for a technology, which makes it possible to print out a paper on demand that has the same effect as the conventional anti-counterfeit paper using a computer and a printer, to attract an attention. Japanese Patent Application Laid-open No. 2001-197297 discloses a technology whereby, when contents data formed using a computer is printed out with a printer, an image called tint block (a copy-forgery-inhibited pattern) is also outputted with superposed on the background of the contents data. The tint block image is an image that is recognized only as a simple pattern or a mere background color in the original (a printed matter outputted by a printer) to the human eye, but, when it is copied, will show up as predetermined characters or the like in the duplicate. Thereby, the same restraint effect as the anti-counterfeit paper can be given to those who copied.

In the case that the contents are printed out together with a tint block image generated by a computer, being superposed thereon, a normal printing paper or the like can be used.

Therefore, this technology has an advantage in terms of cost in comparison with the technology using the anti-counterfeit paper. Moreover, the tint block image can be generated when the contents are outputted by printing. Thereby, characters or the like that will be basically made visible at the time of copying can be set freely. Further more, there is also an advantage that dynamic or any information, such as a user name and printout time and date, can be made to show up as the characters, in addition to static information such as "COPY".

The tint block image, as discussed above, is one that, when being duplicated, visualizes a predetermined character or the like that could not be recognized before duplication, therefore restrains people from using the duplicate, and realizes an effect of enabling people to visually identify what the people sees to be the duplicate, in other words, not to be the original easily. In order to realize this effect, the tint block image is basically composed of two areas; an area which remains (shows up) in the duplicate when being copied, and an area which disappears in the duplicate or becomes too light-colored to recognize compared to the image remaining area. These two areas, as being printed, are of almost the same density, and therefore no one can recognize that characters etc., such as "COPY" that will become visible by duplication are hidden (embedded) therein at first sight, in a macroscopic sense However, in a microscopic sense, for example, in a level of printed dots, these two areas have different characteristics, respectively, as will be shown below. Hereafter, an image that will show up by duplication is called a "latent image" and an image that will disappear or become light-colored is called a "background" for convenience. The tint block image is basically composed of the latent image and the background image. Moreover, there is a case where the tint block image also includes a below-mentioned camouflage image. Incidentally, there may be a case where the latent image is called a foreground as a term related to a user interface.

The latent image portion or the foreground portion of the tint block image, which is an area that remains including the printed dots after duplication, consists of blocks of the concentrated printed dots. On the other hand, the background portion, which is an area whose dots disappear or whose density is made lighter after duplication, consists of the dispersed printed dots.

Note that tint block printing is not limited to the above-mentioned composition, and the tint block image may be composed in such a way that characters, such as a "COPY", a logo, or a pattern will be rendered (will become visible) as an recognizable image to the human eye in the duplicate. That is, even if the characters "COPY" are rendered as outlined characters in the duplicate, it will achieve its object as tint block printing.

FIG. 27 is a view showing these two areas. As shown in this figure, the tint block image is composed of both the background section in which dots are arranged dispersedly and the latent image section in which concentrated dot masses are arranged. These two areas can be generated by mutually different half tone dot processing and dither processing. In the case where the tint block image is generated using the half tone dot processing, half tone dot processing with a small number of lines is suited for the latent image and that with a large number of lines is suited for the background section. In the case where the tint block image is generated using dither processing, dither processing using a dot concentration type dither matrix is suitable for the latent image section, and dither processing using a dot dispersion type dither matrix is suitable for the background section.

Generally, the copying machine has critical points in reproducing capability that depends on input resolution of reading fine dots of a manuscript and output resolution of reproducing fine dots. In the case where the dot in the background section of the tint block image is formed smaller than the critical point of dots that the copying machine can reproduce and the dot masses in the latent image section thereof are formed larger than the critical point, an image composed of larger dot masses of the tint block image is reproduced and an image composed of smaller dots is not reproduced, in the duplicate by copying. As a result, the latent image will be made visible. Moreover, even in the case where dispersed small dots are not completely disappeared by copying, i.e., in the case where the density of the background section is low compared to that of concentrated dot masses, relatively the latent image can be recognized more markedly. Such image that shows up is called a visualized image.

FIGS. 28A and 28B are views showing visualization of the latent image. FIG. 28A is a view corresponding to a state where the tint block image is printed. FIG. 28B is view corresponding to a duplicate obtained when an original image shown in FIG. 28A is copied by a copying machine. From FIG. 28A and FIG. 28B, it may be understood that the latent image by the concentrated dot masses will show up and the background by the dispersed dots will disappear.

Further, it is also known well that a technique called the "camouflage" for making it difficult to recognize a latent image embedded in the original is applied to the tint block image. The camouflage is a technique of arranging a pattern whose density is differentiated from those of the latent image section and the background section to be superposed on the tint block image. The tint block image to which the camouflage is applied has an effect that the camouflage image whose density is different from those of the latent image section and the background section becomes noticeable and the latent image section becomes further less noticeable. Moreover, the camouflage image has an effect of giving a decorative impression to a printed matter. FIG. 29A shows a tint block image to which no camouflage image is given. FIG. 29B shows a tint block image to which a camouflage image is given. In order to make it easy to recognize a visualized latent image in the duplicate after duplication, it is desirable that dots constituting the camouflage image are made not to be reproduced in the duplicate. This can be realized by, for example, drawing the camouflage image as an outlined image, as shown in FIG. 29B.

As is described above, the tint block image is one that is to be printed on the same sheet as an image (hereinafter also referred to as an original image) which is subject for applying brakes to use duplication of that image. Conventionally, during tint block printing, the tint block image is printed across the entire face of a physical sheet (page) on which the original image is to be printed. More specifically, conventionally, whether tint block printing should be applied is individually determined for each physical page. For example, as is described in Japanese Patent Application Laid-open No. 2001-197297, a page for the printing of the tint block image is specified, and the original image and the tint block image are printed on the specified page, without especially specifying an area for printing the tint block image. For this printing, a watermark printing method is employed whereby an original image, in the background of a tint block image, is overwritten, or a superimposition method is employed whereby an OR operation or an AND operation is performed for a tint block image and an original image, and as the obtained results, the tint block image is printed. This can make interference between these images avoided to minimize any reduction in the quality of the original image as much as possible, especially when the area for printing the original image and the area for printing the tint block image are overlapped.

For a problem of controlling the degradation of the quality of the original image, a technique is also available that can specify an area for the printing of a tint block image. According to this technique, for the form printing of debit notes or bonds, a data file (definition data) for tint block printing is prepared separately from data related to the form. Then when the form is to be output, data related to the tint block printing, which are prepared in advance, are obtained to generate a tint block image. Thereafter, the thus produced tint block image and the image of the form are synthesized, and the result is printed out (see Japanese Patent Application Laid-open No. 2001-324898).

However, even when a printing method such as the watermark printing or the superimposition printing described in Japanese Patent Application Laid-open No. 2001-197297 is employed, preventing the quality of the original image from being degraded may be insufficient. For example, for a predetermined image, such as the portrait of a person, that is constructed of an outline portion and a gradation (changing) portion, which are formed of dots, and a blank portion, in which no dots are formed, when the dots used for the tint block image are formed in a part of the blank portion or the gradation portion, the impression got from the image may differ from that of the original, or the image itself may not easily be identified. Further, even if the original image is a character, depending on the printing method employed, the character obtained may be partially got chipped by the tint block image. Furthermore, when the above described camouflage is employed to a tint block image, the camouflage pattern would give an especially strong impression, and degradation of the quality would be more noticeable.

At the same time, some methods are considered in which an area for the tint block image being applied or an area for the tint block image being not applied can be specified to avoid overlapping itself of the printing areas for the original image and the tint block image.

As one of these methods, it may be considered that a pre-printed sheet, on which a tint block image has previously been printed in accordance with a given area of an image form to correspond to the specific original image form, is employed. That is, the pre-printed sheet is not a sheet on which the tint block image is printed over an entire area of the sheet but is a sheet on which the tint block image is printed on only the given area. However, this method differs from the previously described technique whereby a tint block image is output with an original image by using a printer, and is of the same type as the above described technique used for anti-counterfeit sheet. Therefore, basically, the same problems are encountered with this method. More specifically, since such pre-printed sheets are generally expensive and are used only in the printing of specific forms, there is a greater increase in costs. And furthermore, if the printing forms were changed, the pre-printed sheets for tint block images would also have to be changed, so that on taking time and cost expenditures into consideration, the method that uses pre-printed sheets is not economical.

Other methods may be considered, like one described in Japanese Patent Application Laid-open No. 2001-324898. In the method, a special application, which has a function for previously generating a tint block image of a given size which is separate from an original image such as forms, is employed to generate and store a tint block image, and then the stored tint block image is read out and is combined with the original image when printing is performed. However, since the style of the generated tint block image is specialized for the application, it is not possible to apply a tint block image with specifying an area to which the tint block image is to be applied, in connection with an original image such as a document that is generated by another application. That is, so long as the layout of an image to be printed is not known previously, an area on which a tint block image is to be printed, or an area on which the tint block image is not to be printed, can not be specified.

In addition, according to this method, a definition file for specifying the location and the size of a tint block image must be prepared in advance. Thus, it may be often difficult for a user to display image data for which printing is desired (a preview display), and while confirming the image data, to specify a size and a location for an area wherein a tint block image is applied, or for an area wherein the tint block image is not applied. That is, since the area used for a tint block image must be defined in advance, it is difficult to say that, for a user, the degree of freedom and the usability of specifying an area used for a tint block image are high for data having various styles and layouts. Of course, the definition file must be rewritten for changing the layout of data and thus changing the layouts is a very painful operation for the user. That is, this technique can not easily specify a tint block image, which is to be combined, at an arbitrary area of an original image, whatever the type of the original image is.

SUMMARY OF THE INVENTION

The objective of the present invention is to provide an information processing apparatus and an information processing method which can easily specify an area used for a tint block image or an area not used for the tint block image on a single, physical page.

In the first aspect of the present invention, there is provided an information processing apparatus for producing a printed matter, to which a tint block image is added, by using an addition function through which data on the tint block image is added to an image data to be printed out, the apparatus comprising:

user interface means for specifying at least one of a tint block application area or a tint block non-application area in one physical page; and generating means for generating data on the tint block image for the one physical page based on information on the tint block application area or the tint block non-application area, which is specified through the user interface means.

In the second aspect of the present invention, there is provided an information processing method for producing print image data, to which a tint block image is added, by using an addition function through which data on the tint block image is added to an image data to be printed out, the method comprising the steps of:

receiving an input for specifying at least one of a tint block application area or a tint block non-application area intone physical page; and generating data on the tint block image for the one physical page based on information on the tint block application area or the tint block non-application area, which is specified by the input.

In the third aspect of the present invention, there is provided an information processing apparatus having a function to generate print data of input original image data and draw tint block image so that print out data is produced, the apparatus comprising:

display means for displaying the original image data;

specifying means for specifying at least one area which is smaller than a page area of the original image data displayed by the display means;

tint block image setting means for setting predetermined information on the tint block image applied to an inside or an outside of the area specified by the specifying means; and tint block image preview control means for casing the display means to display the original image data in which the predetermined information set by the tint block image setting means is applied to the inside or the outside of the area.

In the fourth aspect of the present invention, there is provided an information processing method having a function to generate print data of input original image data and draw tint block image so that print out data is produced, the method comprising the steps of:

displaying the original image data;

specifying at least one area which is smaller than a page area of the original image data displayed in the display step;

setting predetermined information on the tint block image applied to an inside or an outside of the area specified by the specifying step; and casing the display step to display the original image data in which the predetermined information set in the setting step is applied to the inside or the outside of the area.

With the above configuration, an area used for a tint block image, or an area not used for the tint block image, is specified on a single, physical page. Then, based on information related to the specified area, a process is performed to add or not to add data for the tint block image at the specified area of image data to be output, to generate print image data for the single, physical page. This make the tint block image arranged on an area that is not overlapped with the image to be printed out, by taking into consideration of, for example, a positional relationship between the tint block image and the image to be printed.

Further, since the area used for a tint block image or the area not used is simply specified, a printer driver, for example, can add the tint block image to the specified area.

As a result, a tint block image can effectively be applied to an area desired by a user, and the degrading of the quality of identifying image can be prevented. Moreover, tint block printing using plain paper can also be easily performed, and the time and the cost required can be reduced. The above and other objects, effects, features and advantages of the present invention will become more apparent from the following description of embodiments thereof taken in conjunction with the accompanying drawings.

BRIEF DESCRIPTION OF THE DRAWINGS

FIGS. 20A-20F are views showing examples and arrangements of basic blocks for a foreground and background area specification image;

FIG. 21 is a view explaining special function interfaces provided for a printer driver of the embodiment;

DETAILED DESCRIPTION OF PREFERRED EMBODIMENTS

Hereafter embodiments of the present invention will be described in detail with reference to the drawings.

FIG. 1 through FIG. 19 are views explaining configurations related to print processing and generation of basic drawing data of the tint block image (the copy-forgery-inhibited pattern) accompanying it in a system comprising a host computer that is information processing apparatus and a printer that is printing equipment, according to one embodiment of the present invention.

Note that, in this embodiment, part that will become visible in the duplicate at the time of copying is called a latent image section or a foreground section. Part that will disappear or become light-colored compared to the latent image section in the duplicate at the time of copying is called a background section. And text information, such as "COPY" and "VOID", is included in the latent image section. However, a tint block image according to the present invention is not limited to them. The text information may be in such a form as is represented (visualized) as outlined characters to a surrounding image in the duplicate. In this case, it is understood that a relationship of concentration and dispersion of dots between the latent image section and the background section will become in inverse relation to a relationship for not-outlined characters. The present invention is not prescribed by the kind of tint block image, generating process, color, form, size, etc.

Configuration of Printing System

Figure 1:
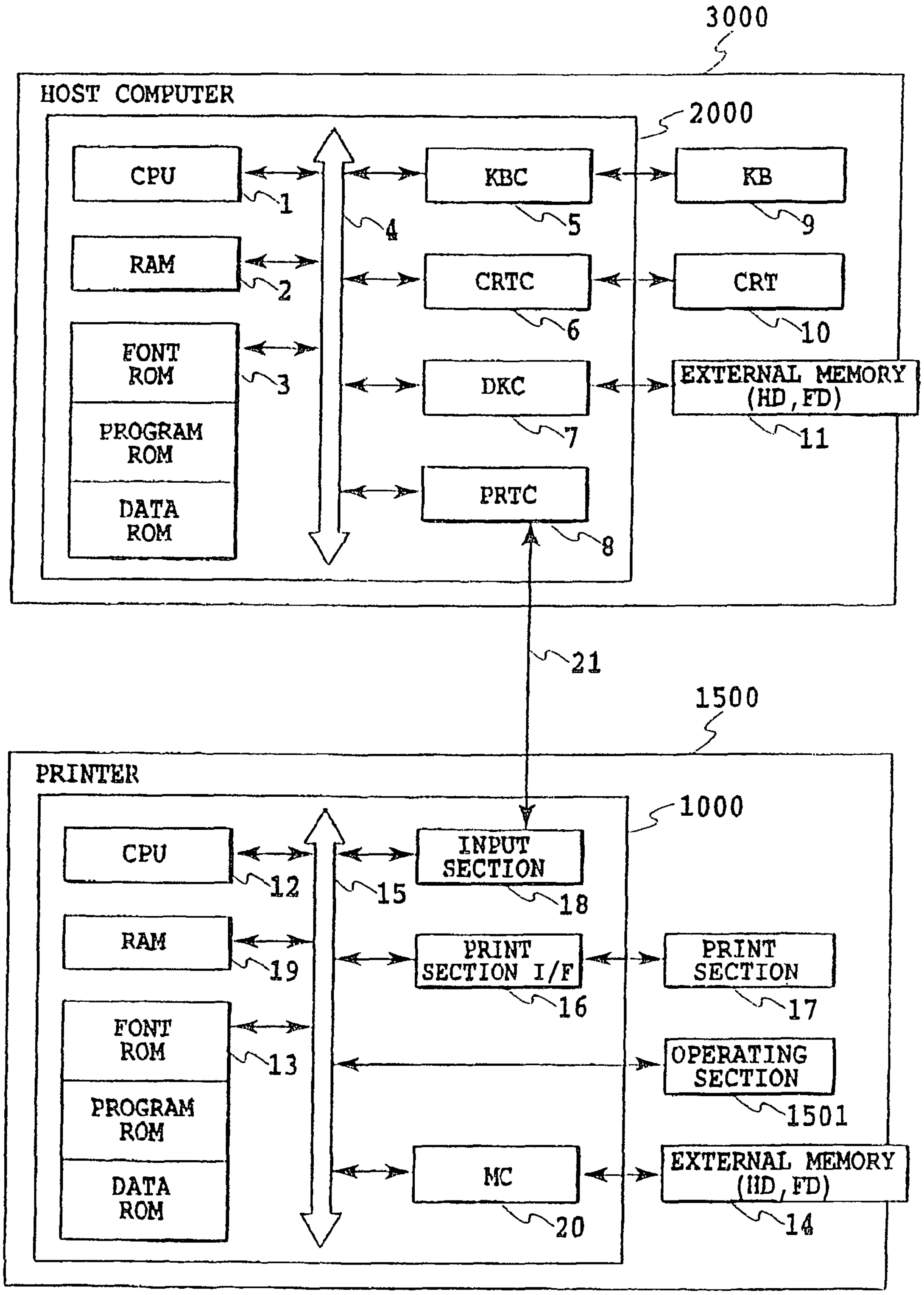
FIG. 1 is a block diagram showing a configuration of a printing system according to the embodiment of the present invention.

FIG. 1 is a block diagram showing a configuration of a printing system according to the embodiment of the present invention. The present invention can be applied to any of a single device, a system comprising a plurality of devices, and a system that is connected to other device/system th-rough a network, such as LAN and WAN, and performs processing, provided that the functions of the present invention are performed.

In this figure, the host computer 3000 is equipped with CPU 1 that controls execution of processing of a document, is in which diagrams, images, characters, tables (including table calculation etc.) etc. are mixed, and which includes processing related to embodiments of the present invention that will be described later, according to a document processing program stored in program ROM of ROM 3 or in external memory 11, and execution of the print processing based on the document processing. The CPU 1 supervises controls of devices connected to system bus 4. Program ROM of the ROM 3 or the external memory 11 stores the operating system (hereinafter ref erred to as OS) that is a control program of the CPU 1 etc. Either font ROM of the ROM 3 or the external memory 11 stores font data used in the document processing etc. Data ROM of the ROM 3 or the external memory 11 stores various data used in performing the document processing etc. RAM 2 functions as main memory, a work area, etc. for the CPU 1.

A keyboard controller (KBC) 5 controls key input from a keyboard 9 and a pointing device (not shown). A CRT controller (CRTC) 6 controls displaying by a CRT display (CRT) 10 including displaying of a tint block image. Reference numeral 7 denotes a disk controller (DKC), which controls access to the external memory 11, such as a hard disk (HD) that stores a boot program, various applications, font data, user files, edit files, a printer control command generating program (hereinafter referred to as a printer driver), a floppy (registered trademark) disk (FD)), etc. A printer controller (PRTC) 8 is connected to a printer 1500 through a bi-directional interface (interface) 21 to execute control processing of communication with the printer 1500.

The CPU 1 performs, for example, a process of spreading (rasterization) outline fonts onto display information RAM being set on the RAM 2, which enables WYSIWYG on the CRT 10. Moreover, the CPU 1 opens various windows previously registered in response to a command directed by an unillustrated mouse cursor etc. on the CRT 10 and performs various data processing. When performing printing, the user can open a window for printing setting and set a print processing method for the printer driver including setting of a printer and selection of a print mode.

The printer 1500 is controlled by CPU 12 installed in the printer 1500. The printer CPU 12 outputs image signals as printout information to a printing section (printer engine) 17 connected to system bus 15 based on a control program stored in the program ROM of ROM 13 etc. or a control program stored in external memory 14 etc. Moreover, this program ROM of the ROM 13 stores a control program of the CPU 12 etc. The font ROM of the ROM 13 stores font data used in generating the printout information etc. The data ROM of the ROM 13 stores information to be used in the host computer etc. in the case where the printer does not have the external memory 14, such as a hard disk.

The CPU 12 is capable of communication processing with the host computer through an input section 18, and can notify the host computer 3000 of information of the printer etc. The RAM 19 is RAM that functions as main memory, a work area, etc. of the CPU 12, and is configured to be able to expand memory capacity by means of optional RAM connected to an expansion port not shown in the figure. Incidentally, the RAM 19 is used for an output information spreading area, an environmental data storing area, NVRAM, etc. Access of the external memory 14, such as hard disk (HD) and IC card mentioned above, is controlled by a memory controller (MC) 20. The external memory 14 is connected as an option, and stores font data, an emulation program, form data. etc. Reference numeral 1501 denotes the operation panel mentioned above, on which switches, an LED display, etc. are placed.

The above-mentioned external memory 14 is not limited to one. Two or more pieces of external memory 14 may be installed and be configured so that an option card in addition to an internal font and an external memory that stores a program for interpreting a printer control language belonging to a different language system can be connected. Moreover, the memory may have NVRAM not shown in the figure and may be configured so as to store printer-mode setting information through the operation panel 1501.

The printing section 17 is equipped with an engine of the electro-photography method in this embodiment. Therefore, the image and accompanying tint block image are printed by means of dots of toner that are formed according to their print data. Note that, in applying the present invention, naturally the method of printing is not limited to the electro-photography method like this. For example, the present invention can be applied to printing equipment of any method whereby printing is done by forming dots, such as the ink jet method.

Figure 2:
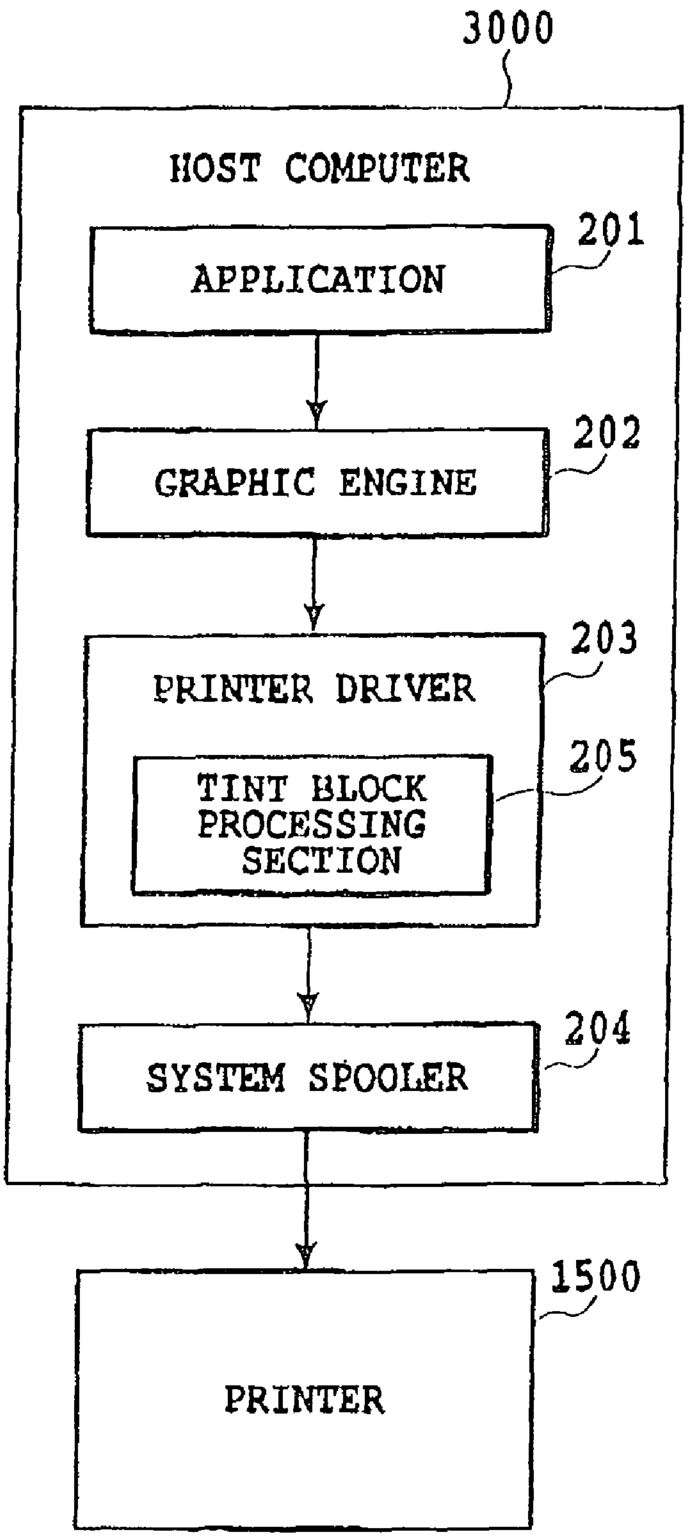
FIG. 2 is a view showing a configuration for print processing in a host computer 3000 shown in FIG. 1.

FIG. 2 is a view showing one configuration for print processing in the host computer 3000 shown in FIG. 1. An application 201, a graphic engine 202, a printer driver 203, and a system spooler 204 exist as files stored in the external memory 11, and each of them is a program module that is loaded into the RAM 2 and executed by the OS or a module using the module when being executed. Moreover, the application 201 and the printer driver 203 can be added to an FD of external memory, unillustrated CD-ROM, or an HD of the external memory 11 through an unillustrated network. The application 201 stored in the external memory 11 is loaded into the RAM 2 and executed. When this application 201 makes the printer 1500 execute printing, the application performs outputting (drawing) using the graphic engine 202 that is loaded similarly into the RAM 2 to be executable.

The graphic engine 202 loads similarly the printer driver 203 prepared for each printing apparatus, such as a printer, into the RAM 2 from the external memory 11, and sets the output of the application 201 in the printer driver 203. Then, it converts the GDI (Graphic Device Interface) function received from the application 201 into the DDI (Device Driver Interface) function, and outputs the DDI function to the printer driver 203. The printer driver 203 converts the output of the application into a control command recognizable to the printer, for example, PDL (Page Description Language), based on the DDI function received from the graphic engine 202. The printing system is configured so that the control command obtained by the conversion goes through the system spooler 204 loaded into the RAM 2 by the "OS," and is outputted to the printer 1500 through an interface 21 as print data.

The printing system of this embodiment has a tint block processing section 205 in the printer driver 203. The tint block processing section 205 may be a built-in module of the printer driver 203, or may be in the form of a library module that is added by individual installation. Moreover, the printer driver 203 executes later-described command generation of the tint block image regarding the printing of the tint block image by calling the tint block processing section 205 into action.

Printing-Related Software Module

Figure 3:
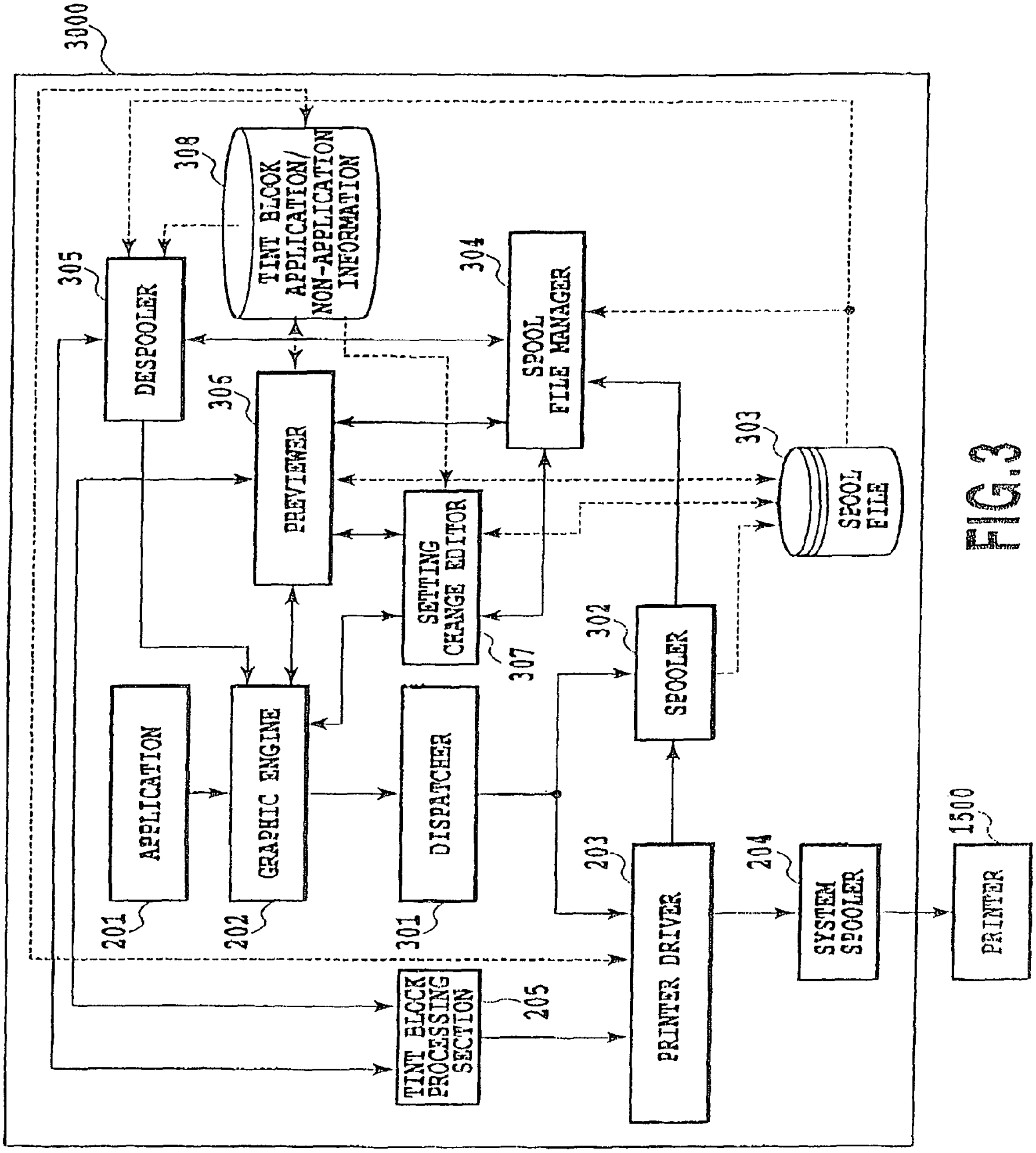
FIG. 3 is a block diagram showing another example of a configuration for print processing in the host computer 3000, this configuration being expanded from the configuration shown in FIG. 2.

FIG. 3 is a block diagram showing a configuration that is an expansion of the configuration shown in FIG. 2, relating to another example of a configuration for print processing in the host computer 3000. This configuration is a configuration in which when a print instruction is sent to the printer driver 203 from the graphic engine 202, a spool file 303 made of an intermediate code is generated temporarily. In the configuration of FIG. 2, the time when the application 201 is released from the print processing is the time when the printer driver 203 has converted all print instructions from the graphic engine 202 into control commands of the printer. In contrast to this, in the configuration of FIG. 3, the time of release is the time when the spooler 302 has converted all the print instructions into intermediate code data, and outputted it to the spool file 303. Usually, the latter finishes in a shorter time. Moreover, the configuration shown in FIG. 3 allows the contents of the spool file 303 to be processed. Thereby, for print data from the application, functions that the application does not possess, such as enlargement, size reduction, printing two or more pages in one page by reducing their sizes, can be realized. For these purposes, the configuration of FIG. 2 is subjected to system expansion so that spooling is performed with the intermediate code data as shown in FIG. 3. Here, in order to process the print data, normally the user should perform setting through the window presented by the printer driver 203, and the printer driver 203 stores the contents of setting in the RAM 2 or in the external memory 11.

Details of the configuration shown in FIG. 3 will be described below. As shown in this figure, in this expanded processing method, a dispatcher 301 receives the DDI function that is a print instruction from the graphic engine 202. If the print instruction (DDI function) that the dispatcher 301 received from the graphic engine 202 is one that is based on the print instruction (GDI function) that the application 201 issued to the graphic engine 202, the dispatcher 301 loads the spooler 302 stored in the external memory 11 into the RAM 2 and sends the print instruction (DDI function) to the spooler 302, not to the printer driver 203.

The spooler 302 analyses the received print instruction, transforms it into the intermediate code for each of pages, and outputs it to the spool file 303. This spool file of the intermediate code stored in units of page is called a page description file (PDF: Page Description File). Moreover, the spooler 302 acquires processing setting (N-up, double face printing, stapling, color/monochrome specification, etc.) regarding print data that is being set for the printer driver 203 from the printer driver 203, and stores it in the spool file 303 as a file in units of job. This setting file stored in units of job is called a job setting file (often called SDF in short: a spool description file). This spool description file will be described later. Note that the spool file 303 is generated in the external memory 11 as a file, but may be generated in the RAM 2. Furthermore, the spooler 302 loads a spool file manager 304 stored in the external memory 11 into the RAM 2, and notifies the spool file manager 304 of a generation situation of the spool file 303. Then, the spool file manager 304 determines whether printing can be performed according to the contents of the processing setting on the print data stored in the spool file 303.

If the spool file manager 304 determines that printing could be performed using the graphic engine 202, it loads the despooler 305 stored in the external memory 11 into the RAM 2. Then, the spool file manager 304 directs the despooler 305 to perform a control command generating process based on the page description file of the intermediate code described in the spool file 303.

The despooler 305 processes the page description file of the intermediate code included in the spool file 303 according to the job setting file including processing setting information contained in the spool file 303 to regenerate the GDI function, and outputs the GDI function through the graphic engine 202 again. In doing so, for generation of a command related to printing of the tint block images the tint block processing section 205 is loaded to perform the processing. In a printing mode by a system of this embodiment, the tint block processing section 205, with the despooler 305, the spool file manager 304 and the like, is concerned with printing of the tint block image, and executes processing for command generating as described later or the like.

In addition, the tint block processing section 205 may be a built-in module in the printer driver 203 or a form of a library module that is added through individual installation.

If the print instruction (DDI function) that the dispatcher 301 received from the graphic engine 202 is one that is based on the print instruction (GDI function) issued by the despooler 305 to the graphic engine 202, the dispatcher 301 sends the print instruction to the printer driver 203, not to the spooler 302. The printer driver 203 generates a printer control command made of a page description language etc. based on the DDI function obtained from the graphic engine 202, and outputs it to the printer 1500 through the system spooler 204.

Further, FIG. 3 shows an example in which a previewer 306 and a setting change editor 307 are placed in addition to the expansion system mentioned above, so that preview including preview of the tint block image, printing setting change, and binding of two or more jobs are made possible. In order to make the system perform the print preview, the printing setting change, or the binding of two or more jobs, it is necessary for the user to first specify "Store" in a pull-down menu 901 that is means for executing "Specification of output destination" in the property of the printer driver shown in FIG. 8. Incidentally, if the user only wishes to see preview, it can also be done by selecting "Preview" as specification of output destination.

The contents being set up in the property of the printer driver in this way are stored in the structure (called DEVMODE in Windows (registered trademark) OS) that the OS provides as a setting file. The structure contains, for example, setting as to whether storing in the spool file manager 304 is performed in the processing setting kept in the spool file 303. When the spool file manager 304 has read the processing setting through the printer driver and a specification of storage has been made, the page description file and the spool description file are generated and stored in the spool file 303 as described above. Moreover, a window screen of the spool file manager is popped up to display a list of jobs spooled in the spool file 303.

If preview of a certain single job or a combined job is specified on the window screen of the spool file manager, the previewer 306 stored in the external memory 11 is loaded into the RAM 2, and the previewer 306 is instructed to perform preview processing of the job in the intermediate code described in the spool file 303.

Tint Block Application Area and Tint Block Non-application Area Information

According to this embodiment, as is shown in FIG. 3, for a physical page, i.e., a sheet of one page to be printed, tint block application/non-application area information 308 is provided as information indicating an area for applying a tint block image and an area for not applying a tint block image. Specifically, the tint block application/non-application area information 308 is stored on a storage area, such as an HD, a memory or on an external medium which are accessible by the information processing apparatus of this embodiment.

In this embodiment, three constructions are prepared for specifying of an area for applying a tint block image and an area for not applying a tint block image on a single, physical page.

As a first construction, an application that permits a user to create the original image and to specify an area on a page wherein the original image is drawn is employed, as an application for generating the original image, such as a document. Then, this application specifies an area for applying a tint block image and an area for not applying a tint block image through a special interface provided in a printer driver, and this area information is set as the tint block application/non-application area information 308. This specifying process and the special interface used for this process will be described in detail later while referring to FIG. 21.

As a second construction, the tint block application/non-application area information 308 is set through a tint block setup screen described later while referring to FIG. 16A. The setup process will be described in detail later while referring to FIG. 16A.

As a third construction, the tint block application/non-application area information 308 is set or changed, while the display state is interactively altered using the previewer 306 or the setup change editor 307. This operation will be described later while referring to FIG. 22 and the following drawings.

In the embodiment of the present invention, a user can independently use the above-described three constructions. For example, in the case that the user creates the original image by using an application in the first construction, the user can specify the area for applying the tint block image or the area for not applying the tint block image, through the application. Or, a user, who uses an application that does not have such a function and creates the original image such as the document, can employ the second or third construction. Furthermore, when the tint block application/non-application area information 308 is set by using the first or the second construction, the previewer for the third construction can be used to determine the specified area, and the area can be changed in accordance with the results of the determination.

The thus set or updated tint block application/non-application area information 308 is referred by the despooler 305, and a tint block image is generated so that the tint block image applied to the tint block application area and is not applied to the tint block non-application area. The thus obtained tint block image is transmitted through the graphic engine 202 and the printer driver 203 to the system spooler 204, and then to the printer 1500.

Storage Processing of Intermediate Print Data

Figure 4:
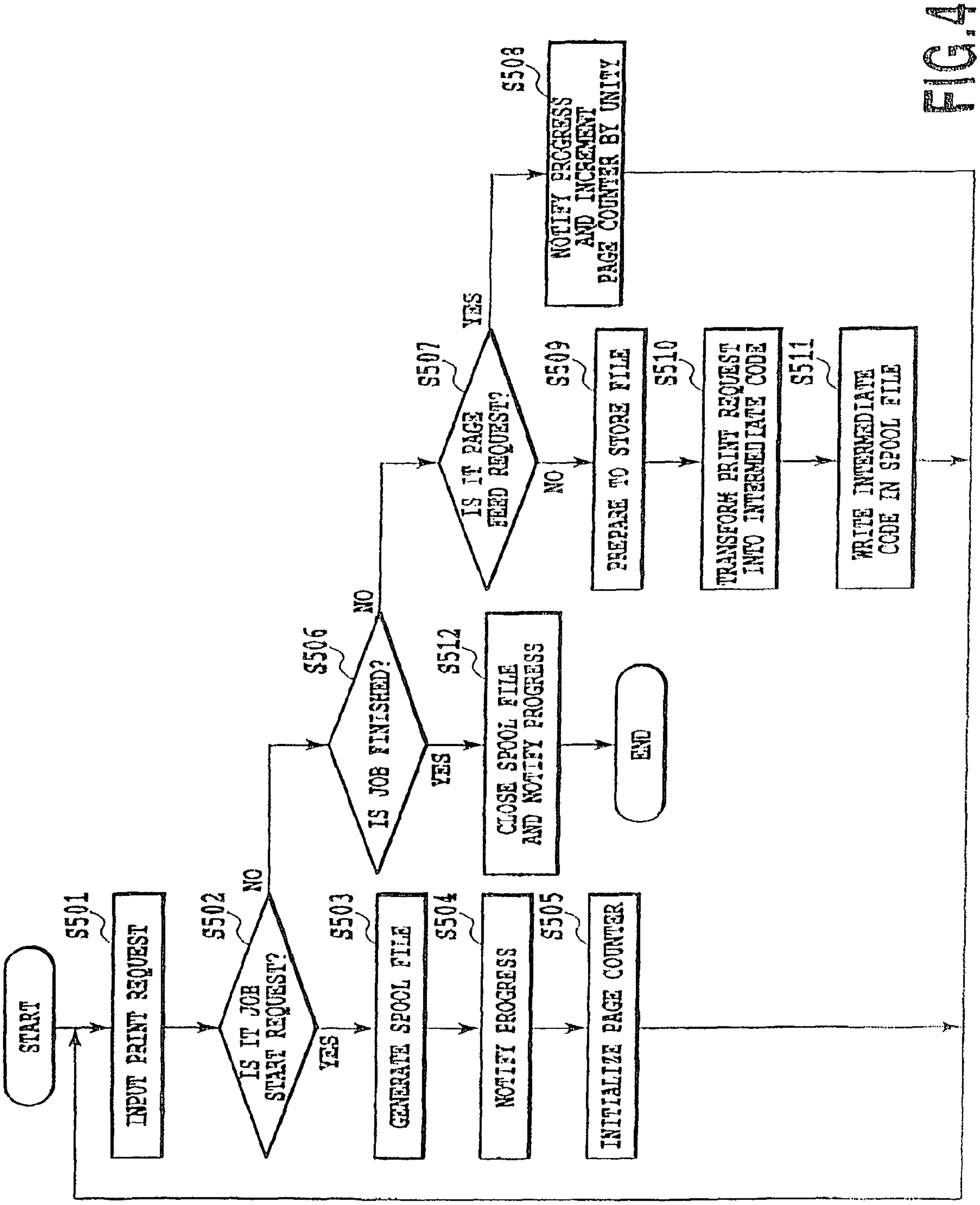
FIG. 4 is a flowchart showing processing of a saving step in units of page in a spooler 302 generating a spool file 303.

FIG. 4 is a flowchart showing processing of a storing step for a unit of page in the spooler 302 generating the spool file 303.

Figure 7:
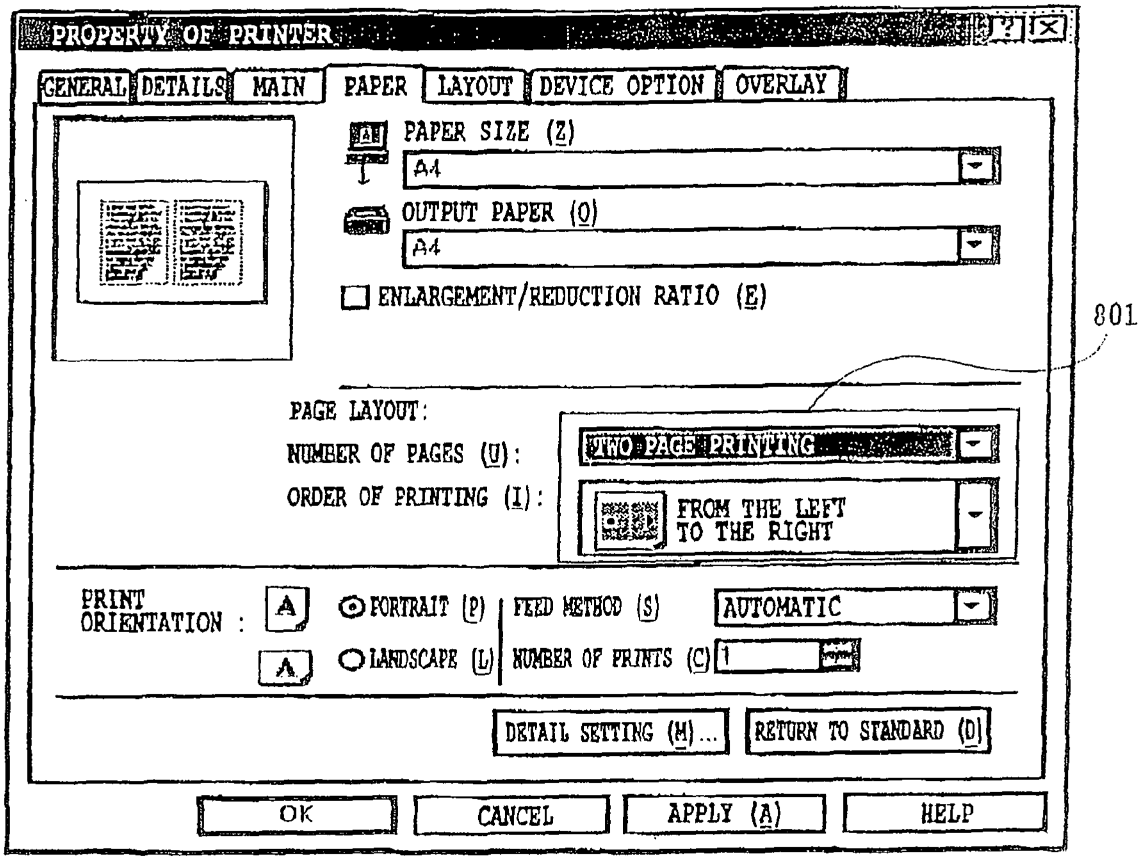
FIG. 7 is a view showing one example of the printing setting input dialog.
Figure 8:
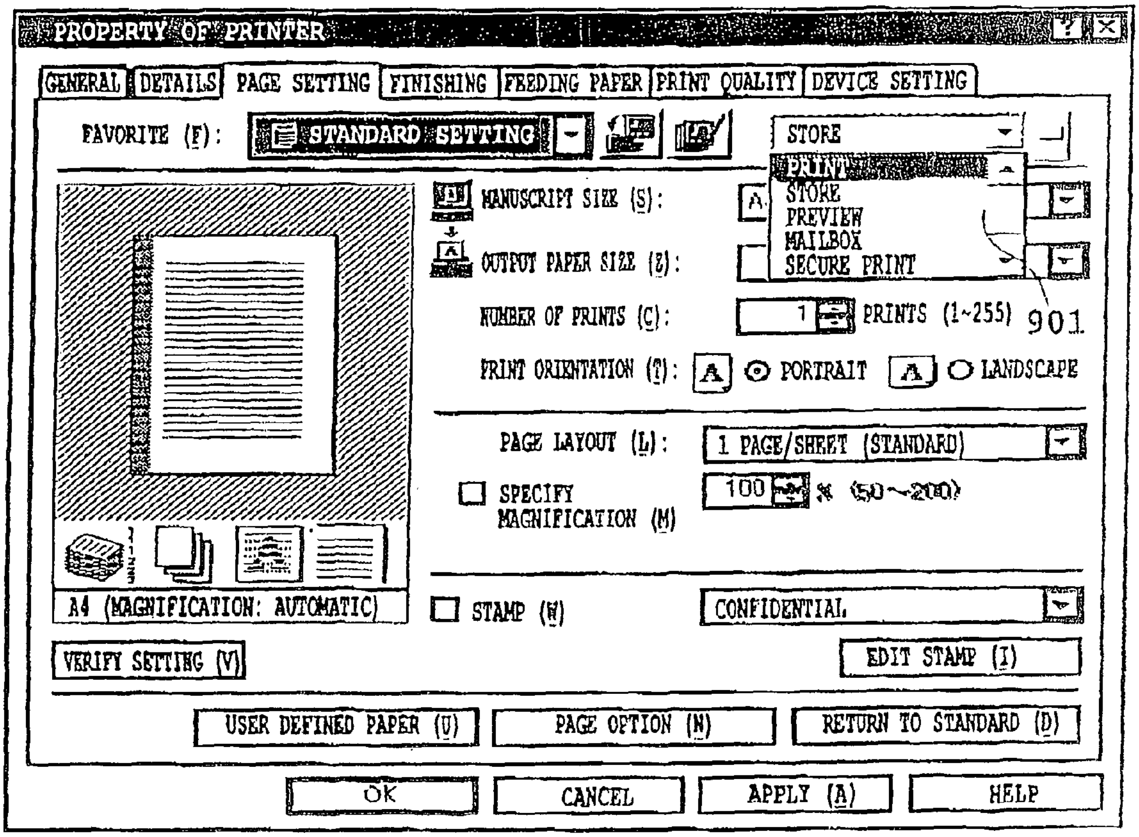
FIG. 8 is a view showing one example of a setup screen for output destinations of a print job.

In this figure, first, the spooler 302 receives a print request from the application through the graphic engine 202 in Step 501. In the application, a dialog through which printing settings as shown in FIG. 7 are entered is displayed, and the printer driver passes the printing settings entered through this dialog to the spooler 302. The setting input dialog shown in FIG. 7 includes a setup entry, represented by numeral 801, to determine the number of logical pages to be laid out on one physical page, and the like.

In Step 502, the spooler 302 determines whether the received print request is a Job start request. Here, if the request is determined to be the job start request in Step 502, the operation flow (the flow) proceeds to Step 503, where the spooler 302 generates a spool file 303 in which intermediate data is temporarily stored. Subsequently, in Step 504, the spooler 302 notifies the spool file manager 304 of the progress of the print processing. In subsequent Step 502, the spooler 302 initializes a page number counter thereof to unity. Here, the spool file manager 304 reads and stores information of the job for which printing is started, processing setting, or the like from a spool file 303.

On the other hand, in Step 502, if the request is determined not to be the job start request, the flow proceeds to Step 506. In this Step 506, the spooler 302 determines whether the received request is a job end request. If the request is determined not to be the job end request, the flow proceeds to Step 507, where the spooler 302 determines whether the request is a page feed request. If the request is determined to be the page feed request in Step 507, the flow proceeds to Step 508, where the spooler 302 notifies the spool file manager 304 of the progress of the print processing. Then, the spooler 302 increments the page counter, closes the page description file storing the intermediate codes, and generates a next page description file. If the spooler 302 determines that the received request is not a page feed request in Step 507, the flow proceeds to Step 509, where the spooler 302 prepares writing of the intermediate codes in the page description file.

Next, in Step 510, in order to store the print request in the spool file 303, the spooler 302 transforms the DDI function of the print request into the intermediate code. In Step 511, the spooler 302 writes the print request (intermediate code) transformed into a storable form in Step 510 in the page description file of the spool file 303. Then, the flow returns to Step 501 to receive a print request from the application again. This process consisting of a series of Step 501 through Step 511 is continued until a job end request is received from the application. Moreover, the spooler 302 acquires simultaneously information of processing setting stored in a DEVMODE structure from a printer driver 203, and stores it in a spool file 303 as the job setting file. On the other hand, if the spooler 302 determines a print request from the application to be a job end request in Step 506, the flow proceeds to Step 512 because the print request from the application has been all completed. There the spooler 302 notifies the spool file manager 304 of the progress of the print processing and finishes the processing.

Generation of Spool File

Figure 5:
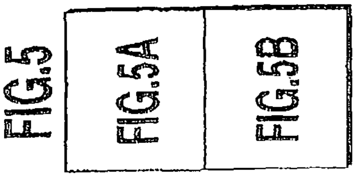
FIG. 5 is a block diagram showing a relation between FIG. 5A and FIG. 5B, and FIGS. 5A and 5B are flowcharts showing details of control between a spool file 303 generating process and a print-data generating process, which will be described below, in a spool file manager 304.
Figure 5A:
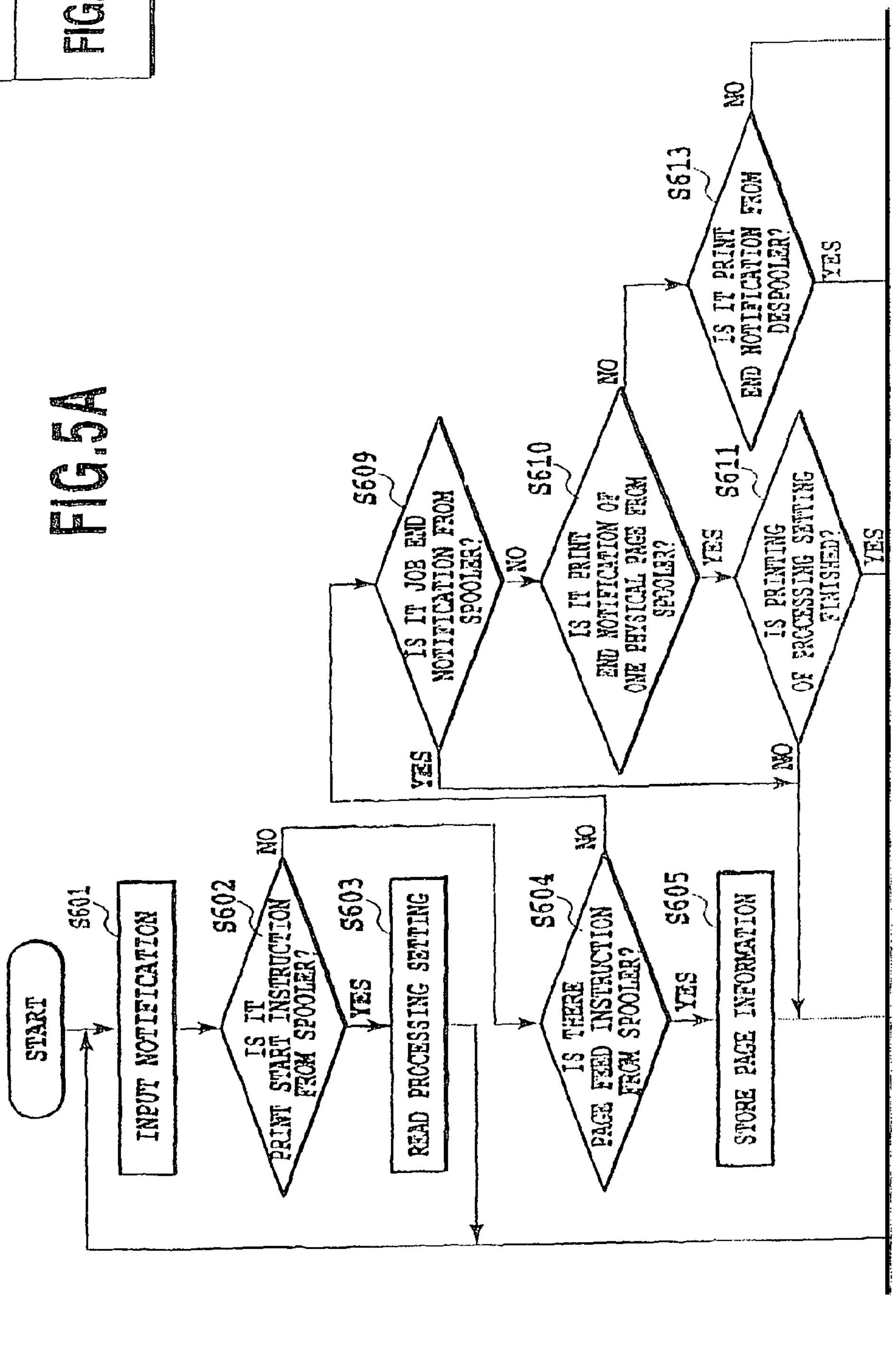
Figure 5B:
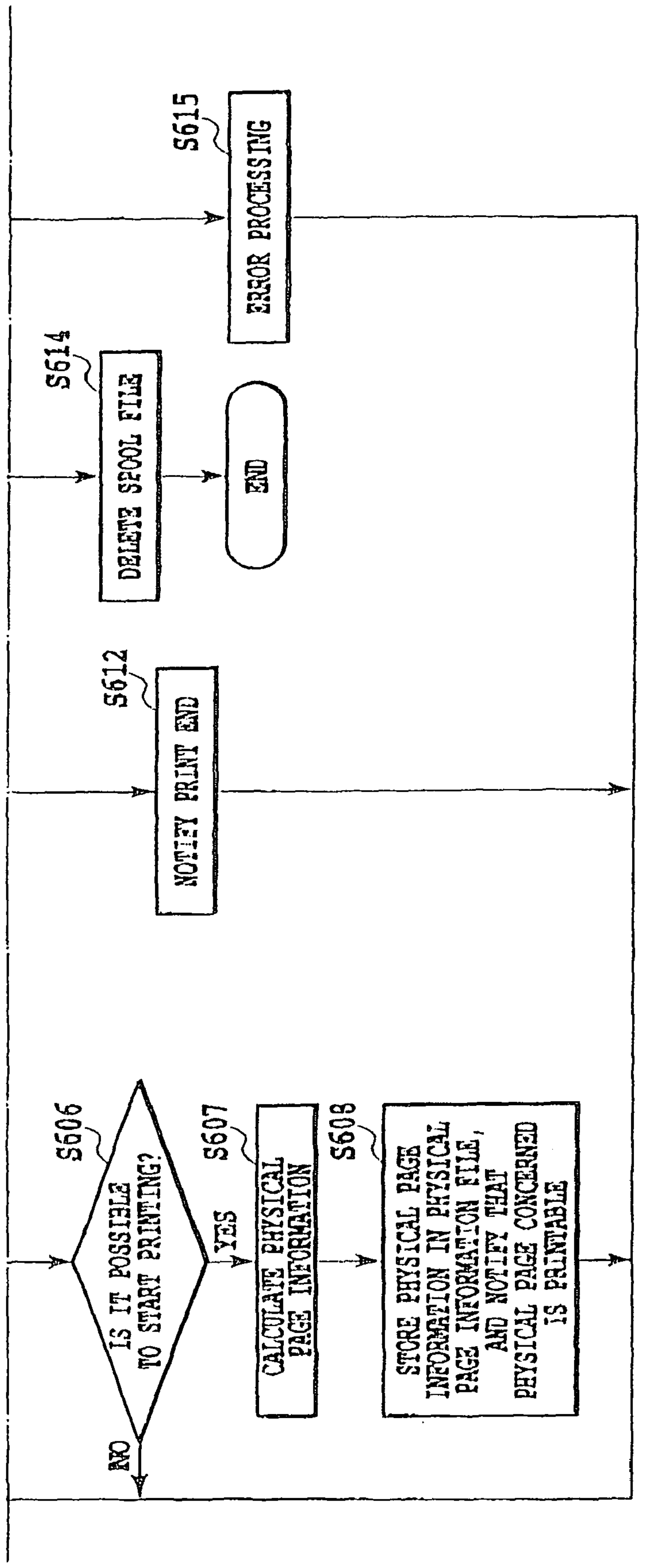

FIG. 5 is a flowchart showing details of control between the spool file 303 generating process and the print-data generating process in the spool file manager 304.

In Step 601, the spool file manager 304 receives a notification of the progress of the print processing from the spooler 302 or the despooler 305. Then, in Step 602, the spool file manager 304 determines whether the notification of progress is a print start notification from the spooler 302 notified in the above-mentioned Step 504. If the notification is the print start notification, the flow proceeds to Step 603, where the spool file manager 304 reads processing setting of printing from the spool file 303 and starts management of the job. On the other hand, in Step 602, if the notification is not the print start notification from the spooler 302, the flow proceeds to Step 604. In Step 604, the spool file manager 304 determines whether the notification of progress is a print end notification of one logical page from the spooler 302 notified in the above-mentioned step 508. Here, if the notification is the print end notification of one logical page, the flow proceeds to Step 605, where the logical page information for this logical page is stored. Then, in subsequent Step 606, the spool file manager 304 determines whether printing of one physical page can be started for n-logical pages whose spooling has ended at this time. Here, if being printable, the flow proceeds to Step 607, where a physical page number is determined based on a logical number assigned to one physical page to be printed.

Calculation of physical pages is done as follows: for example, in the case where processing setting is such that four logical pages are arranged in one physical page, the first page becomes ready to be printed at the time when the fourth logical page has been spooled, the first page being outputted after the printing. Then, the second physical page becomes ready to be printed at the time when the eighth logical page has been spooled. Incidentally, even if the total number of logical pages is not a multiple of the number of logical pages arranged in one physical page, the logical pages arranged in one physical page can be determined with a spool end notification in Step 512.

Figure 9:
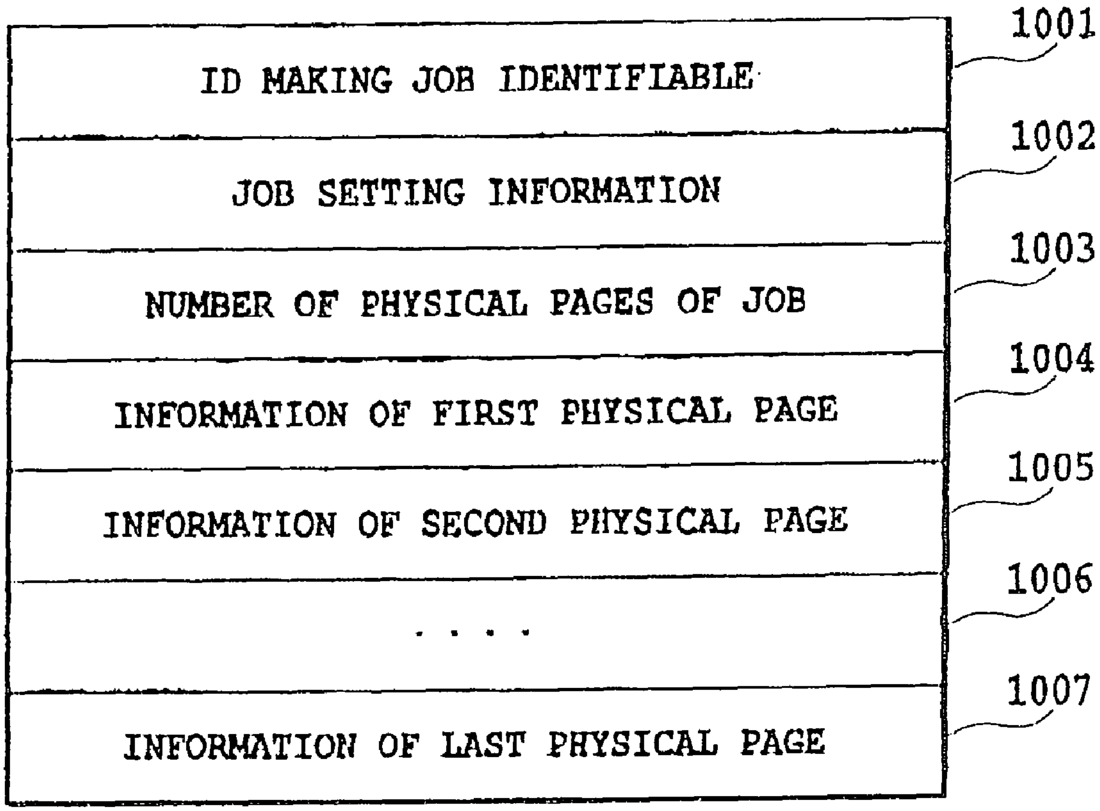
FIG. 9 is a view showing one example of a data format that is passed to the despooler 305 from the spool file manager 304 when issuing a print request of physical pages thereto.

Further, in Step 608, information of logical page numbers constituting physical pages that become ready to be printed, their physical pages, or the like are stored in a job-output setting file (a file containing physical page information). FIG. 9 shows a storing format. It is notified to the despooler 305 that physical page information has been added for one physical page. Subsequently the flow returns to Step 601 to wait for a next notification. In this embodiment, the print processing is possible when one page of print data, i.e., logical pages constituting one physical page, is spooled, even if the whole print job has not been finished.

On the other hand, when a notification of progress is not a print end notification of one logical page from the spooler 302 in Step 604, the flow proceeds to Step 609, where the spool file manager 304 determines whether the notification is a job end notification from the spooler 302 notified in the above-mentioned Step 512. Here, if the notification is the job end notification, the flow proceeds to the above-mentioned Step 606. On the other hand, if the notification is not the job end notification, the flow proceeds to Step 610, where the spool file manager 304 determines whether the received notification is a print end notification for one physical page from the despooler 305. Here, if the notification is the print end notification for one physical page, the flow proceeds to Step 612, where the spool file manager 304 determines whether the whole of the processing setting has been finished. If the process is finished, the flow proceeds to step 612, where the spool file manager 304 notifies the spooler 305 of termination of the processing. On the other hand, if it is determined that the process of processing setting has not been finished, the flow proceeds to the above-mentioned Step 606. The despooler 305 in this embodiment takes one physical page as a unit by which the despooler 305 performs the print processing. Moreover, in Step 608, adopted is a style that information necessary to perform the print processing of one physical page is stored in a file sequentially, so that the file is reusable. If reuse is unnecessary, the information processing apparatus maybe of an implementation type that a fast medium, such as shared memory, is used and the medium is overwritten in units of physical page successively to enhance the speed and save resources. Moreover, in the case where the progress of despooling is faster than the progress of spooling or in the case where despooling is started after the termination of the spooling of all pages, by notifying the content that a plurality of physical pages or all physical pages become printable in response to the progress of despooling side, without notifying that page printing is possible for each physical page, in Step 608, then number of notifications can be saved.

If the notification is determined not to be a print end notification of one physical page from the despooler 305 in Step 610, the flow proceeds to Step 613, where the spool file manager 304 determines whether the notification is a print end notification from the despooler 305. If the notification is determined to be the print end notification from the despooler 305, the flow proceeds to Step 614, where the spool file manager 304 deletes a corresponding page description file 303 and finishes the processing. On the other hand, if the notification is not the print end notification from the despooler 305, the flow proceeds to Step 615, where-the spool file manager 304 performs other normal processing and waits for a next notification.

Output of Spool File

Figure 6:
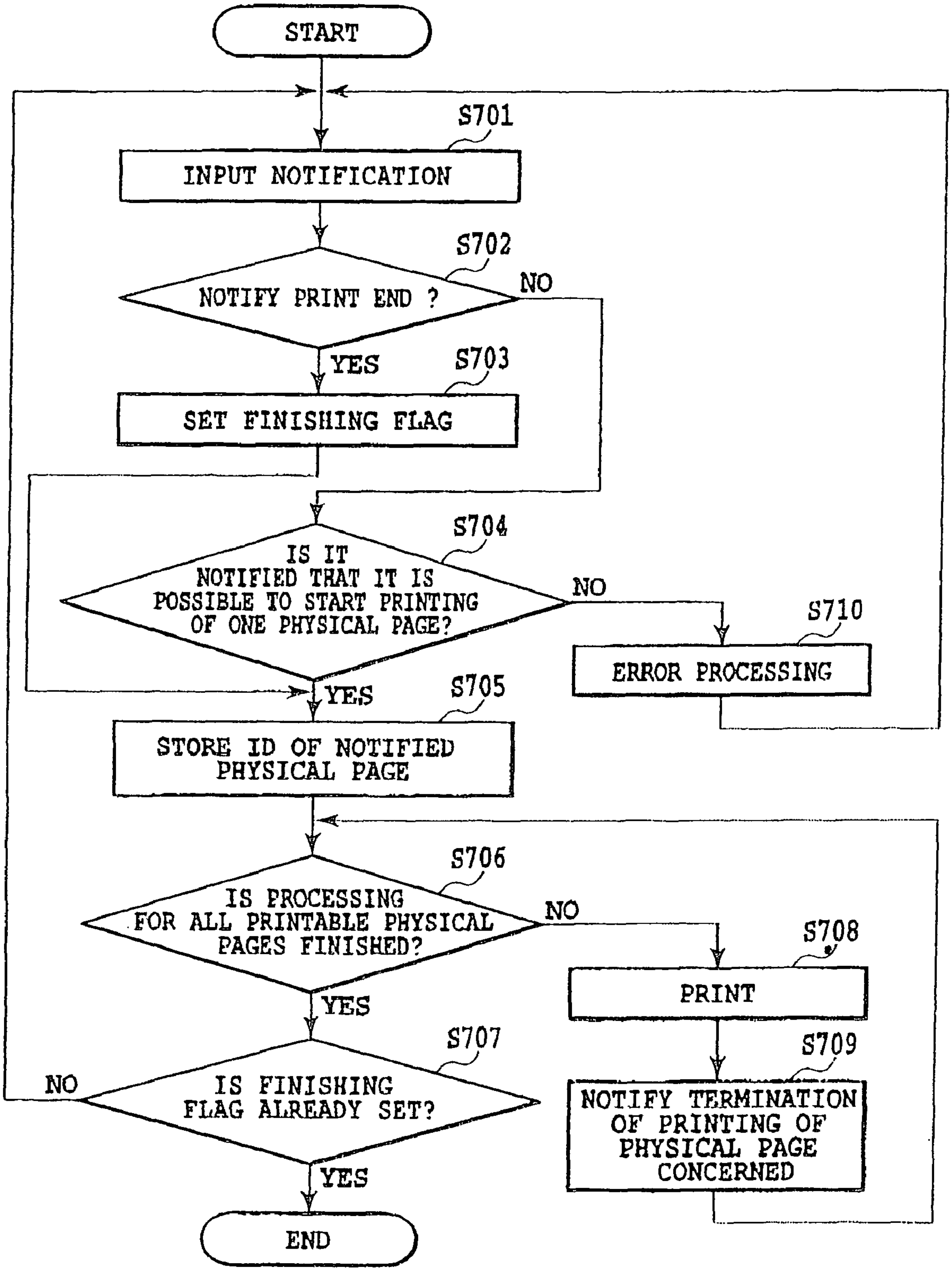
FIG. 6 is a flowchart showing details of the print-data generating process in a despooler 305.

FIG. 6 is a flowchart showing details of the print-data generating process in the despooler 305.

In response to a print request from the spool file manager 304, the despooler 305 reads necessary information (page description file and spool description file) from the spool file 303 and generates print data. A method of transferring the generated print data to the printer is as already discussed in FIG. 3. Moreover, print data is in PDL as already discussed.

In generating print data, first a notification from the above-mentioned-spool file manager 304 is inputted to the despooler 305 in Step 701. In subsequent Step 702, the despooler 305 determines whether the inputted notification is a job end notification. If the notification is the job end notification, the flow proceeds to Step 703, where the despooler 305 set an ending flag, and the flow proceeds to Step 705. On the other hand, if the notification is not the job end notification in Step 702, the flow proceeds to Step 704, where the despooler 305 determines whether the print start request of one physical page in the above-mentioned Step 608 was notified. If the notified request is not determined to be the print start request in Step 704, the flow proceeds to Step 710, where the despooler 305 performs other error processing, and the flow returns to Step 701 to wait for a next notification.

On the other hand, if the request is determined to be the print start request of one physical page in Step 704, the flow proceeds to Step 705, where the despooler 305 saves the ID of printable physical pages notified in Step 704. In subsequent Step 706, the despooler 305 determines whether the print processing has been finished for all physical pages whose IDs are saved in Step 705. Here, if all physical pages have been processed, the flow proceeds to Step 707, where the despooler 305 determines whether an ending flag is set in the above-mentioned Step 703. If the ending flag is set, the job is assumed to have been printed, the despooler 305 notifies the spool file manager 304 of termination of the processing thereof and finishes the processing. In Step 707, if the ending flag is not set, the flow returns to Step 701 to wait for a next notification.

On the other hand, if it is determined that printable physical pages are remaining in Step 706, the flow proceeds to Step 708, where the despooler 305 reads IDs of unprocessed physical pages from saved physical page IDs successively, reads information necessary to generate print data of physical pages corresponding to the read physical page IDs, and perform the print processing. To perform the print processing, the despooler 305 transforms a print instruction stored in the spool file 303 into a format (GDI function) conceivable to the graphic engine 202 and transfers it. For the processing setting to lay out a plurality of logical pages in one physical page (hereinafter referred to as N-page printing), the despooler 305 transforms it considering size reduction and arrangement in this step.

When having finished necessary print processing, the despooler 305 notifies the spool file manager 304 of termination of print data generation of one physical page in subsequent Step 709. Then, the flow returns to Step 706 again, and Steps 708, 709, and 706 are repeated until the print processing is performed for all IDs of printable physical pages saved in Step 705.

The above is a flow of the print processing using the dispatcher 301, the spooler 302, the spool file manager 304, and the despooler 305. By processing as described above, the application 201 is released from the print processing at the time when the spooler 302 generates the intermediate code and stores it in the spool file 303; therefore, the print processing can be finished in a shorter time than the print data is directly outputted to the printer driver 203. Moreover, since the intermediate files (the page description file and the spool description file) based on printing settings of the printer driver are kept temporarily in the spool file 303, the user is enabled to recognize a print preview of what will be printed actually. Moreover, since the intermediate file is being kept, a combination and rearrangement of print jobs generated by two or more applications become possible, and alteration of the printing setting is performable without launching the application again to perform printing.

Note that the job-output setting file is generated at the time of requesting the graphic engine 202 to perform printing in the print processing using the spooler 302, and that the job-output setting file is also generated when preview, job combination, or the like is performed. The job-output setting file is equal to the spool description file in the case of a single job; the job-output setting file is generated based on two or more pieces of the job setting information in the case of a combined job. Here, he job-output setting file will be described.

Composition of Job-Output Setting File

FIG. 9 shows an example of the job-output setting file keeping information constituting physical pages that has been generated to be printable by the spool file manager 304 in Step 608. The field 1001 is for an ID used for identifying a job. This ID can also be kept in the form of the name of a file name or the name of shared memory that keeps this information. The field 1002 is for the job setting information. The job setting information includes one piece of information that can be set up for one job as follows: a structure necessary to start printing of a job for the graphic engine 202; specifications of N-page printing; specifications of additional drawing, such as a page frame; finishing specifications, such as the number of copies and stapling; and the like. In the job setting information 1002, enough information is stored according to functions for the job. The field 1003 is for the number of physical pages of a job, which indicates as much pieces of physical page information as this figure are stored in subsequent fields after this. Since this embodiment adopts a system of notifying the number of printable physical pages, the equipment can work without this field. After this field, a field 1004 through the last field store physical page information to the number stored in the field 1003. Physical page information will be described in FIG. 12.

Figure 10:
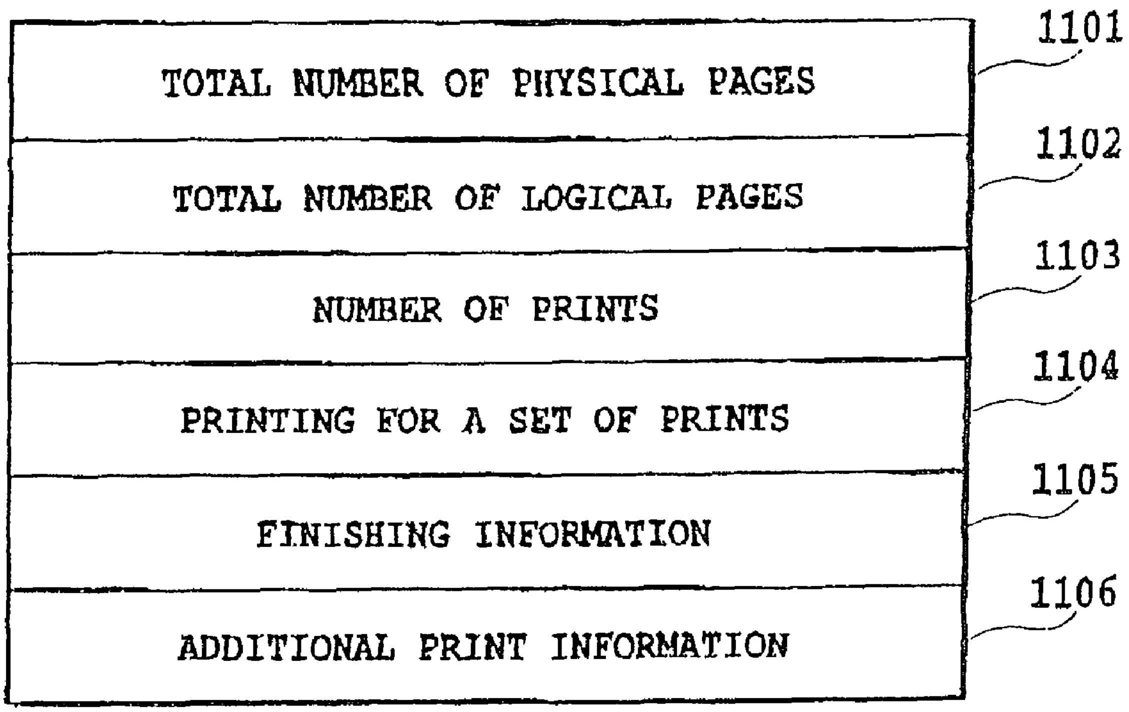
FIG. 10 is a view showing one example of job setting information shown in the field 1002 of FIG. 9.

FIG. 10 is a view showing one example of the job setting information shown in the field 1002 of FIG. 9. The field 1101 is for the total number of physical pages. The field 1102 is for the total number of logical pages The fields 1101 and 1102 are used in the case of printing the number of pages etc. as additional information in addition to the print data, and in other cases. When printing is being continued, the both fields are set to temporal values, or the spool file manager 304 postpones generation of information of printable physical pages until the printing is finished. A field 1103 is for number-of-copies information that specifies how many copies of this print job should be printed. A field 1104 is for specifying whether printing should be done by making collated sets of copies in the case where the field 1103 specifies printing of two or more sets of copies. A field 1104 is for specifying finishing information, such as stapling, punching, and Z-character folding, which is specified in the case where the printer has a finisher in it or outside the printer. A field 1106 is for storing addition print information that is added to a job as follows: the tint block printing according to the present invention; decoration such as a page frame; additional information such as date; user name; the number of pages; watermark printing; etc. As the number of functions increases, the number of fields included in this job setting information increases. For example, in the case where the printer is capable of double face printing, a field for storing specifications of double face printing is added.

Figure 11:
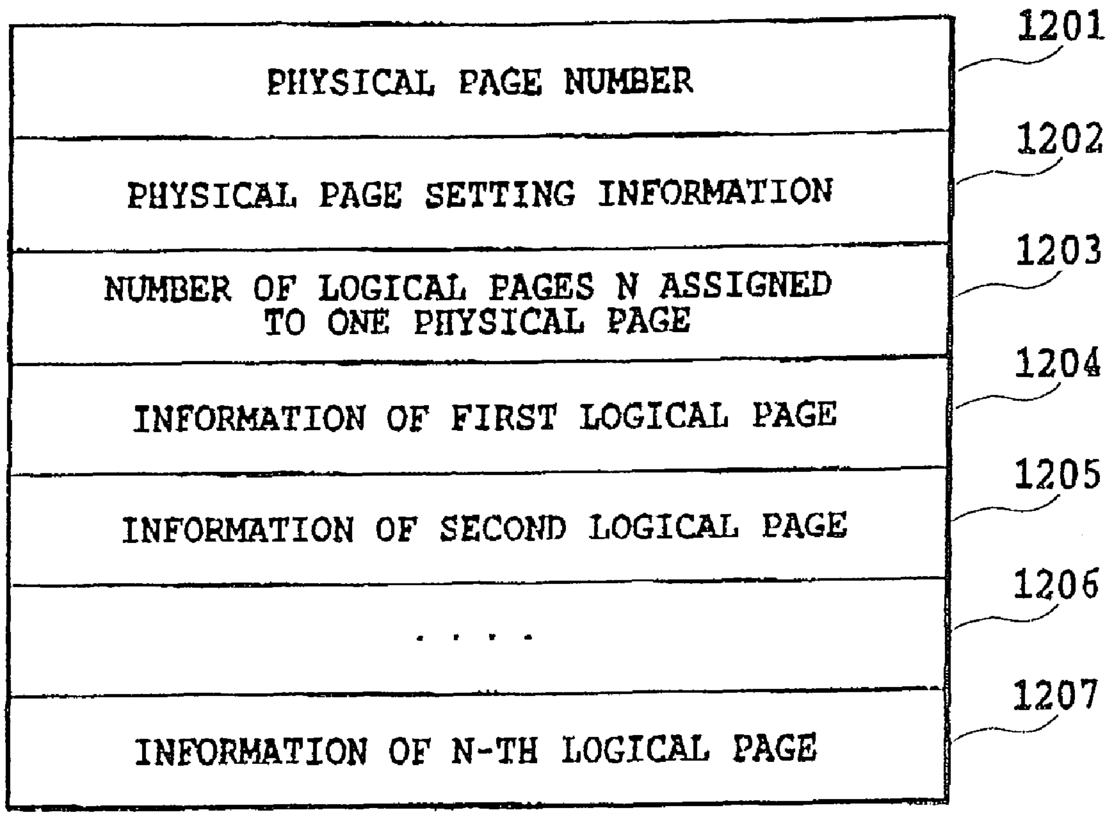
FIG. 11 is a view showing one example of a data format that is passed to the despooler 305 from the spool file manager 304 when issuing the print request of physical pages thereto.

FIG. 11 is a view showing one example of the physical page information shown in the field 1004 of FIG. 9. The first field 1201 is for physical page number, whose value is used in managing the order of printing and in printing the physical page number additionally. The field 1202 is for physical page setting information, storing settings of layout and color/monochrome if layout and color/monochrome can be specified for each physical page. The field 1203 is for the number of logical pages allocated to this physical page; when four pages are allocated to one physical page, an ID indicating "4" or "four page printing" is stored. The field 1204 and subsequent fields store information of the logical page by the number specified by the field 1203. The may be a case where the actual number of page data becomes fewer than the number of pages specified by the field 1203 depending on the number of pages printed by the application 201. In that case, this discrepancy is coped with by storing special data indicating an empty page in the logical page information.

Figure 12:
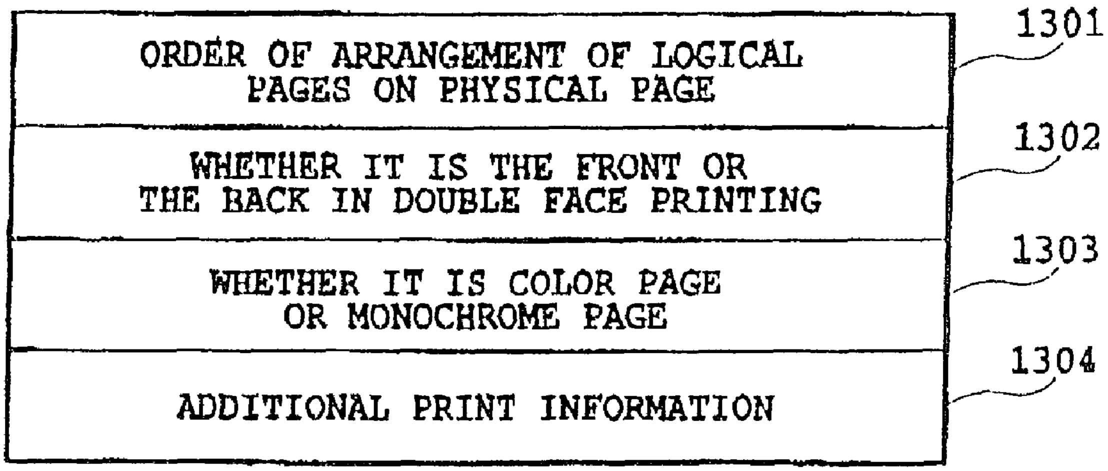
FIG. 12 is a view of an example of physical page setting information in the field 1202 in FIG. 11.

FIG. 12 is a view showing an example of the physical page setting information 1202. The field 1301 is for the order of arrangement of logical pages on physical page, storing specifications on how the logical pages should be arranged on the physical page in N-page printing (the upper left to the side, the upper left to the down, etc.). Some system may arrange pieces of logical page information in the field 1204 and thereafter, not in the order of page number, but in the order of arrangement in place of the setting of the field 1301. The field 1302 is for information of the front/back in double face printing, which is used, for example, to set a binding margin in a proper side for the front and the back. The field 1303 is for specifying color pages or monochrome pages, storing a value used in the case where a printer has a monochrome mode and a color mode, and the user wishes to print color pages in a color mode and monochrome pages in a monochrome mode in a document mixed with color pages and monochrome pages, and in other cases. The field 1304 is for additional print information, used in the case of printing additional information, such as the page number and date, on the physical page. As for physical page setting information, a field may be added according to functions of the system.

In this embodiment, since the tint block image printing explained with reference to FIG. 15 and thereafter is information added to the physical page, it is also stored in the field 1304 as setting information for each physical page based on information about the tint block printing kept in the field 1106 shown in FIG. 10. One example of data format used for storing the setting information about the tint block printing in the additional print information 1106 and the additional print information 1304 for a job will be described later with reference to FIG. 14.

Figure 13:
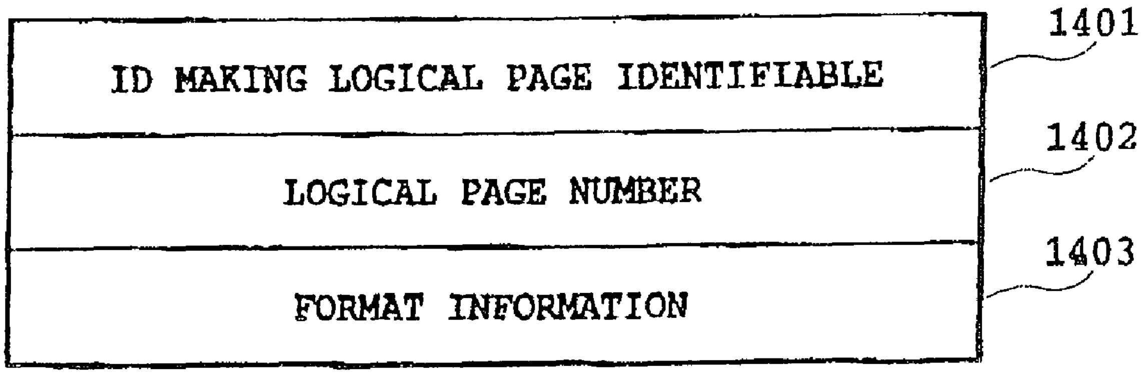
FIG. 13 is a view showing one example of a data format that is passed to the despooler 305 from the spool file manager 304 when issuing the print request of physical pages thereto.

FIG. 13 is a view showing one example of logical page information shown in the field 1204. The field 1401 is for the ID of a logical page, and using this ID an intermediate code of the page description file corresponding to the logical page is referred from the spool file 303. This ID is just required to allow access to the intermediate code of the logical page using this ID, and may be a file, a memory pointer, or the intermediate code itself constituting the logical page. The field 1402 is for the logical page number, and is used in the case of printing the logical page as additional information or used as supplementary information to the logical page ID. Various setting entries that can be stored in units of logical page are stored in the field 1403 of format information. For example, information of various setting specified in units of logical page, such as additional printing information, such as a page frame, and enlargement/reduction ratio. Moreover, if necessary, it is also possible to store attribute information for logical page, such as color/monochrome information for each logical page. On the contrary, in such a system as requires neither switching of the settings in units of logical page nor attribute information for each logical page, the field 1403 is unnecessary.

Figure 15:
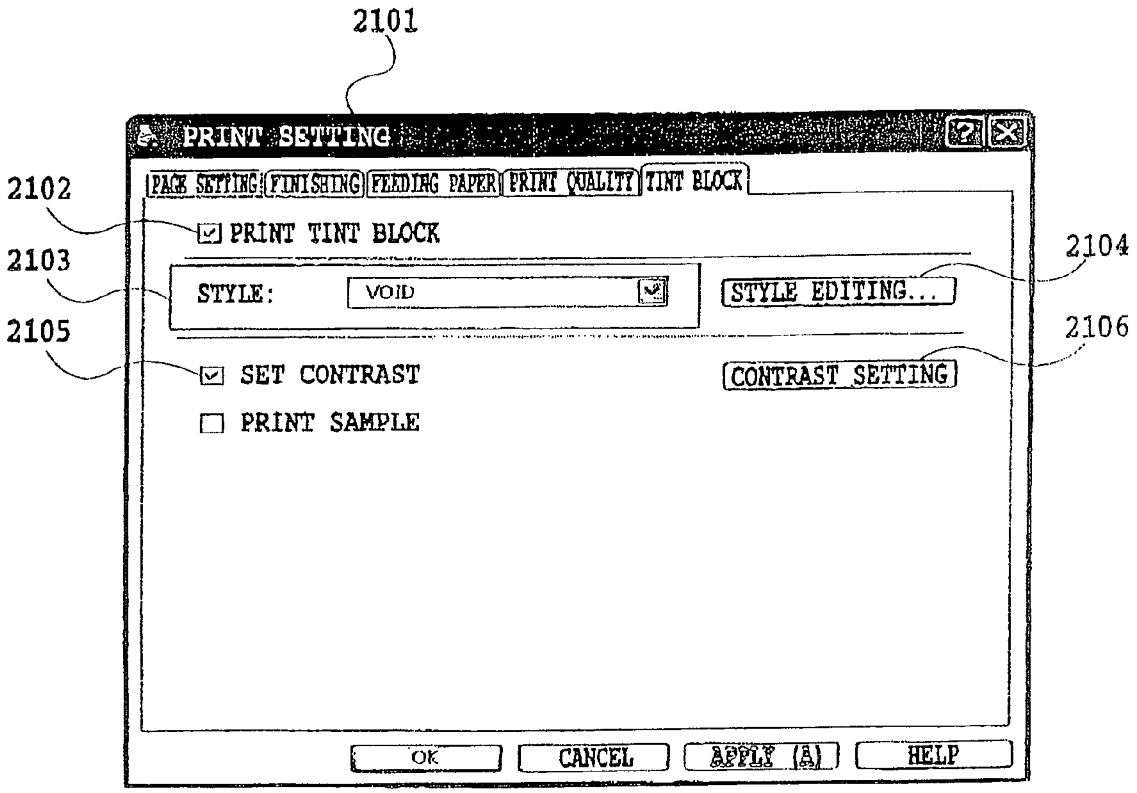
FIG. 15 is a view showing one example of a setup screen of tint block printing function.
Figure 16A:
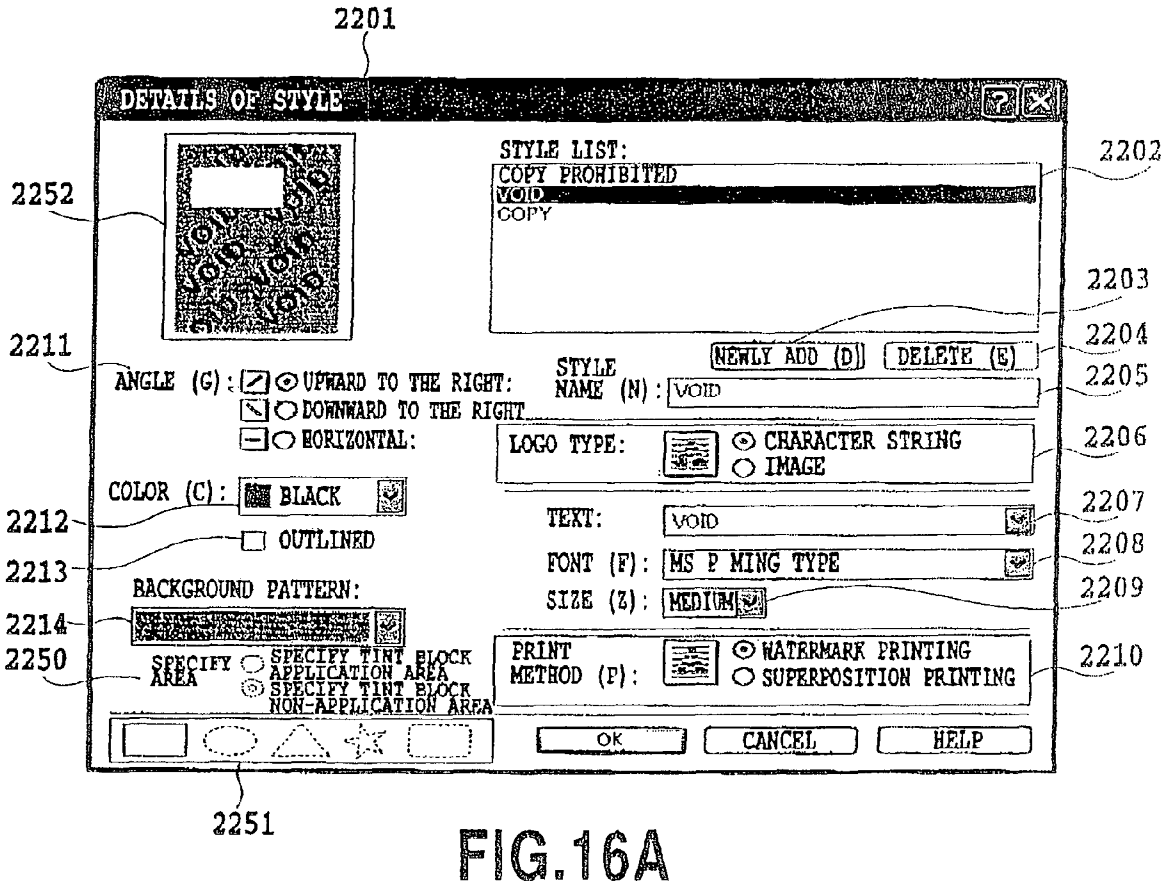
FIGS. 16A and 16B are views showing one example of the dialog used for editing detailed setting of the tint block printing function.
Figure 16B:
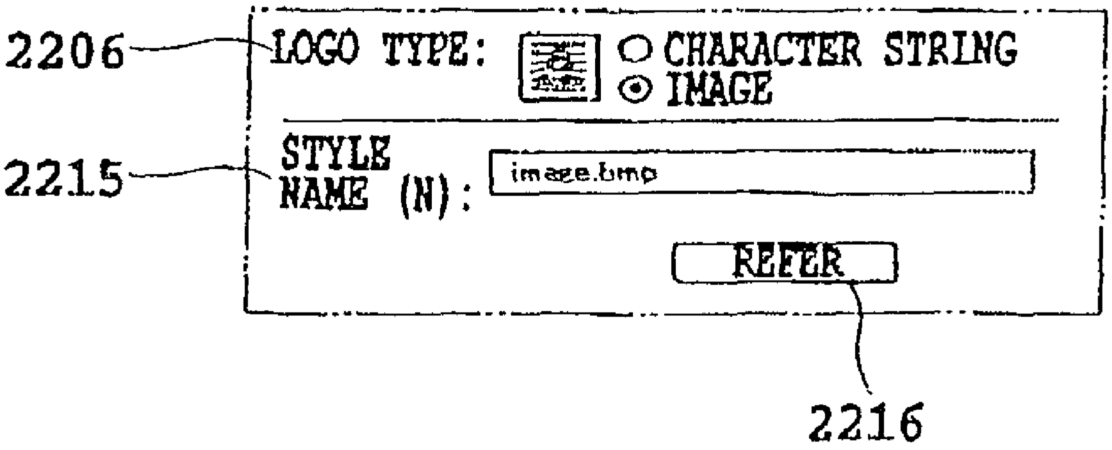

In this embodiment, function setting information relating to tint block printing, which is described in reference to FIG. 15 and FIGS. 16A and 16B, is not held in the field 1403, for preventing a pattern used for tint block printing from being affected by enlargement or reduction of the logical page by N-up process.

The job-output setting file is composed as described above. In addition, the spool description file is almost the same as the job-output setting file; for job information, consisting of printing appearance (single-sided/double-sided, printing and book binding), printing layout (N-up, poster printing), additional information (tint block printing information, watermarking, date, username, etc.), the number of copies, and paper size; and for each physical page, consisting of arrangement order of logical pages, whether it is the front or the back in double face printing, a color mode, etc.

Further FIG. 3 shows an example in which the setting change editor 307 with a function of changing settings of a job is placed in addition to the expansion system that has heretofore been described. The setting change editor 307 is an editor that can change interactively the contents of the spool description file or the job-output setting file both mentioned above. Since the setting change editor 307 is not related to the present invention directly, its explanation is omitted.

Structure of Program Interface (I/F)

The first construction for the application/non-application of a tint block employs special function interfaces provided for the printer driver 203. That is, a user uses the application to create an original image, such as a document, and also uses the tool of the application for specifying a tint block application area or a non-application area, so as to perform an operation, as in the second and third constructions described later, wherein a symbol having a predetermined shape, such as a rectangle, an ellipse or the like, for representing a specified area is arranged in the tint block application area or the tint block non-application area, or the size of the symbol is changed. And before the original image is printed, in accordance with the set symbol and its location, this application calls the special function interface of the printer driver 203 and sets the tint block application area or the tint block non-application area as the tint block application/non-application area information 308. In addition, the application area or the non-application area can be set at plural areas in one page.

FIG. 21 is a diagram for explaining special function interfaces.

In FIG. 21, StartEditSecureMark( ) is a function interface for instructing the start of editing for a tint block application area or a tint block non-application area. When this interface is called, the printer driver 203 performs the initialization processing for generating the tint block application area/non-application area information 308. EndEditSecureMark( ) is a function interface for instructing the end of editing for a tint block application area or a tint block non-application area. When this function interface is called, the printer driver 203 determines the tint block application/non-application area information 308. Within a range defined between StartEditSecureMark( ) and EndEditSecureMark( ), the application specifies the tint block application area or the tint block non-application area. Therefore, even if the function interfaces described below, for specifying a tint block application area or non-application area, are called are outside this range, the functions of these interfaces can not be performed. In addition, a plurality of ranges each defined between StartEditSecureMark( ) and EndEditSecureMark( ) may be specified and then a plurality of areas may be specified as the tint block application areas or non-application areas.

AdaptAllArea( ) is a function interface for making all the effective printing area of a physical page be a tint block application area, while EraseAllArea( ) is a function interface for making all the effective printing area be a tint block non-application area. The initial state, immediately following the start of the editing by StartEditSecureMark( ), is the state wherein all the areas are for the application of a tint block or for the non-application of a tint block. However, by using the two functions, AdaptAllArea( ) and EraseAllArea( ), the initial state can be changed respectively.

SetSecureMarkMode( ) is a function interface for setting a tint block application or a tint block non-application mode in accordance with a described parameter. This function can also be employed to change the mode, depending on which mode was set in the initial state.

Succeeding interfaces DrawRectangle( ), DrawPolygon( ), DrawEllips( ) and the like are function interfaces for respectively describing a tint block application area and a tint block non-application area. By describing a parameter in accordance with a predetermined form, a rectangular area, a polygonal area, an elliptical area or the like can be specified as a tint block application area or a tint block non-application area.

In accordance with the use state of the parameter, the parameter transmitted by the application is represented by using an absolute value relative to a print sheet, or a relative value based on the width and the height of an effective printing area as references. Furthermore, the forms of the function interfaces are not limited to those shown in FIG. 21; various other forms can be employed for the function interfaces. The tint block application/non-application area information 308 is information in which the parameters received through the function interfaces are described.

FIG. 15 through FIGS. 16A and 16B are views showing one example of the user interface by which a setup about the tint block image printing is performed.

FIG. 15 is one example of an initial screen of the user interface related to the tint block printing, the user interface being placed in the printer driver 203. In this example, the user interface allows the user to make settings about the tint block printing in a property sheet 2101 in the dialog.

Figure 14:
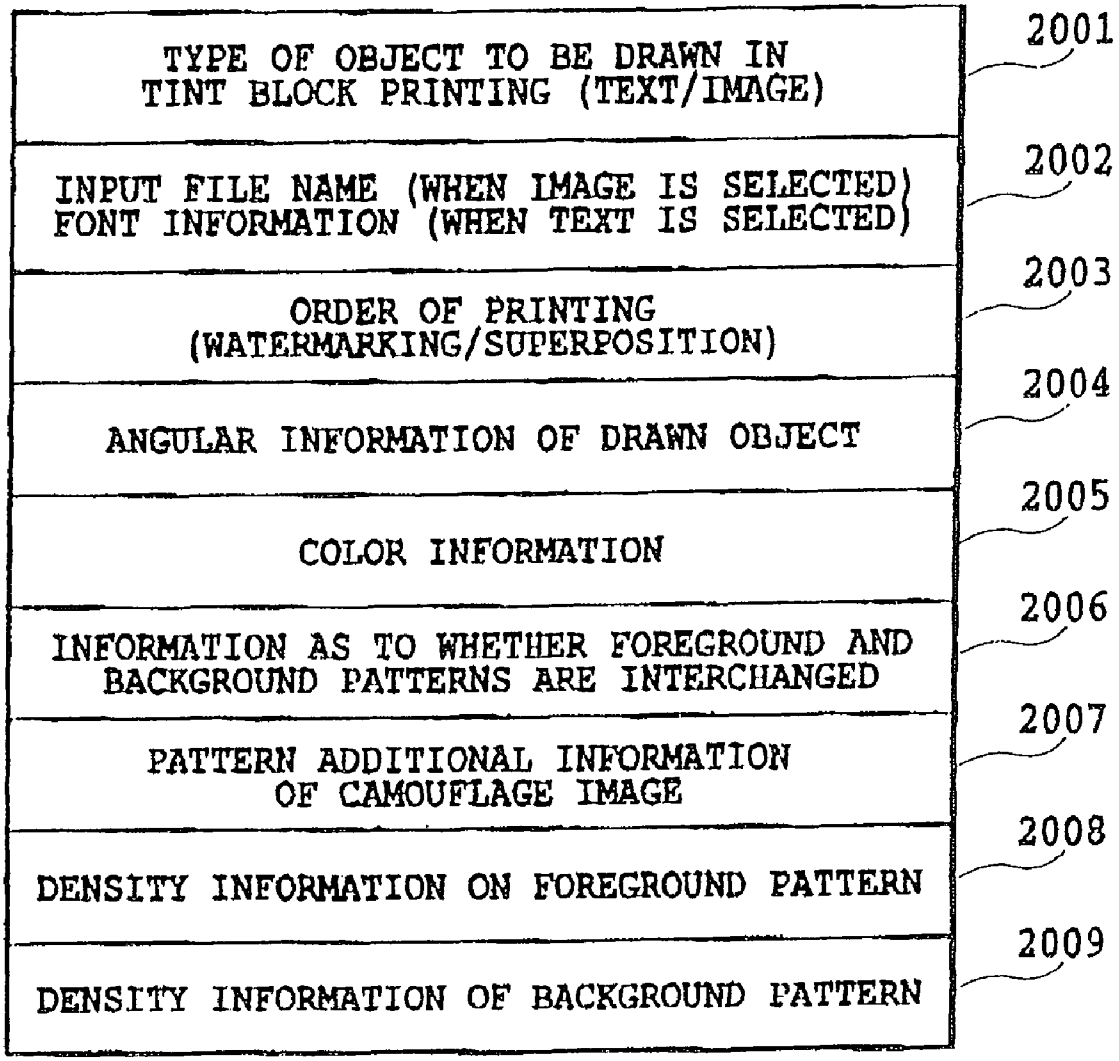
FIG. 14 is a view showing one example of the data format of additional print information 1304 in FIG. 12.

Reference numeral 2102 denotes a check box used for specifying whether the tint block printing (printing including the tint block image, and the sane thereafter) is performed for the print job. This specification is stored in the additional printing information 1106 in FIG. 10 as a setting as to whether the tint block printing is performed. Numeral 2103 denotes a field for storing style information for enabling a single identifier (style) to specify two or more pieces of setting information of the tint block printing. The printer driver 203 is made capable of selecting a plurality of styles, and a relationship between each style and the tint block printing information shown in FIG. 14 is registered in a registry. Moreover, by the user pressing the button 2104, a dialog for style editing 2201 shown in FIG. 16A is displayed. Numeral 2105 denotes a check box used in adjusting the contrast between the foreground and the background in the tint block printing. When the user presses the button 2106, a contrast adjustment screen (not shown) will be displayed.

FIG. 16A is a view showing one example of a dialog used for editing individual detailed settings of the tint block printing.

The dialog is what is expanded for realizing the second construction that specifies the tint block application area or the tint block non-application area, that is, the construction that can specify the tint block application area or the tint block non-application area through a UI screen by the printer driver.

In this figure, reference numeral 2201 denotes the whole dialog for editing tint block image information. In this display area, a result of the tint block image generated by several pieces of tint block image information that will be described later is displayed for preview. Numeral 2202 denotes an area for displaying a list of styles that can be selected in the area 2103 of FIG. 15. The user is allowed to add a new style and delete any style using the buttons 2203 and 2204. Reference numeral 2205 denotes an area where a style name currently specified is displayed.

Reference numeral 2206 denotes a radio button with which the kind of a drawing object used for tint block printing is selected. When the user selects a "character string" by operating this radio button 2206, the text object will be used; when the user selects an "image," image data typified by BMP etc. will be used. Since a "character string" is selected in FIGS. 16A and 16B, setting information specified by numerals 2207 through 2209 is displayed in the dialog 2201, and the user is allowed to edit it. On the other hand, when "Image" is selected in the area 2206, information 2207 through 2209 is not displayed, but instead an image file name in the field 2215 and a button 2216 for displaying a file selection dialog (not shown) are displayed, as shown in FIG. 16A.

Reference numeral 2207 denotes an area for displaying and editing a character string used as a tint block image. Numeral 2208 denotes an area for displaying and editing font information of the character string. Although in this embodiment a selection screen shows only font names, choices may be expands to information of a type face (bold, italic, etc.) and information of an initial decorated with figures so that the user can select it. Numeral 2209 denotes an area for displaying and specifying a font size of the character string used as the tint block pattern. Although this embodiment employs a style in which three stages of "Large," "Medium," and "Small" can be specified, a font-size specifying method commonly used, such as direct input of the point number, may be adopted. Numeral 2210 denotes a radio button with which the order of printing of the tint block pattern and the manuscript data is defined. When "watermark printing" is specified, the tint block image is drawn on bit map memory of the printer and subsequently the manuscript data is drawn so as to be overwritten on the tint block image. On the other hand, when "superposition printing" is specified, first the manuscript data is drawn on the memory and subsequently the tint block image is drawn thereon so as to be overwritten on the manuscript data. Detailed processing of the drawing will be described later.

Reference numeral 2211 denotes a radio button with which an arrangement angle of the tint block pattern is specified. In this embodiment, three choices of "upward to the right", "downward to the right", and "horizontal" are selectable. The angle specifying method may be expanded in such a way as to provide a numerical value entry area whereby an arbitrary angle can be specified or a slider bar that allows the user to specify an angle intuitively. Numeral 2212 denotes an area for displaying and specifying color used for the tint block pattern (foreground and background patterns). Numeral 2213 denotes a check box used for interchanging the foreground pattern and the background pattern. The tint block is printed as follows if the check box is not checked off, the foreground pattern will show up in the duplicate at the time of copying; and if it is checked off, the background pattern will show up and the foreground pattern will be represented as outlined characters at the time of copying.

Reference numeral 2214 denotes an area used for specifying a camouflage image that makes the tint block pattern embedded in the manuscript hard to recognize, which can be selected from a plurality of patterns. Moreover, there is also provided a choice of using no camouflage image.

A reference numeral 2250 denotes an area used to select a mode to specify either a tint block application area or a tint block non-application area for the second construction. A reference numeral 2251 denotes an area for choosing the shape of the area in a mode selected through the area 2250. In the example shown in FIG. 16A, the non-application area specifying mode is selected in the area 2250, and the rectangle is selected in the area 2251 as the shape of the area.

When the shape is selected in the area 2251, graphics of the shapes other than the selected shape are displayed with a grayout state or with a broken line, or the color of the background of the shapes other than the selected shape is changed slightly, in order to notify a user that one shape is selected. At the same time, the graphic of the selected shape is displayed in an easy preview area 2252. The user employs an input device (a pointing device), such as a mouse, to adjust the size and the location of this graphic, so that the tint block application area or the tint block non-application area is specified. When the non-application area specifying mode is selected, as is shown in FIG. 16A, the internal portion of the graphic displayed in the easy preview area 2252 is painted a solid. This allows the user to recognize the interior of the graphic as a tint block non-application area. On the other hand, when the application area specifying mode is selected, a sample tint block image is drawn inside the rectangular graphic so that the user can recognize the internal portion of the graphic as a tint block application area. In addition, the tint block application area or the tint block non-application area can be specified as a plurality of specified areas. In this regard, the plurality of areas may be specified with the same shape graphic, or may be specified with the shape graphic of at least one area differing form other areas.

As is described above, the user can adjust, in the easy preview area, the size and the location of a tint block application area or non-application area, with performing, as needed, the selection of a mode for specifying either a tint block application area or a tint block non-application area or a change in the shape of the area, in the shown dialog. When the tint block application area or the tint block non-application area is determined by an operation such as user's pressing the OK button in the shown dialog, the printer driver 203 generates the tint block application/non-application area information 308 based on the information displayed in the easy preview area 2252. The tint block application/non-application area information 308 is stored in the same manner as when the tint block application area s specified through the program I/F for the first construction. It should be noted that when the tint block application area is specified on the UI screen of the printer driver as described above for the second construction, the size actually used for printing is not determined, and thus the coordinates of each area specified object are represented by relative values for which the width and the height of the effective printing area are used as references.

Data Format of Tint Block Printing Setting Information

Next, formats of data stored in additional print information 1106, 1304 related to the tint block printing setting information described in FIGS. 16A and 16B will be described using FIG. 14.

In this figure, the field 2001 stores a value indicating the type of drawing object (text or image) generated in the tint block printing that is specified in the area 2206 of FIG. 16A. The field 2002 stores setting information for a drawing object specified by information in the field 2001 that is specified by areas 2207-2209 in FIG. 16A or by FIG. 16B. When text is selected, it stores a character string, a font name, and size information; when image is selected, it stores a location of the image file to be inputted. The field 2003 stores information that specifies whether the tint block pattern is drawn prior to or after the manuscript data (the order of drawing) and that is specified in the area 2210 of FIG. 16A. The field 2004 stores information of an angle at which the drawing object is disposed and that is specified in the area 2211 of FIG. 16A. The field 2005 stores information of colors that are used in the tint block pattern (foreground and background patterns) and that are specified in the area 2212 of FIG. 16A. The field 2006 stores information as to whether the foreground pattern and the background pattern are interchanged and that is specified by the check box 2213 of FIG. 16A. The field 2007 stores pattern additional information of a camouflage image specified in the area 2214 of FIG. 16A. The field 2008 stores density information of the foreground pattern, which is specified through the contrast adjustment screen. The field 2009 stores density information of the background pattern, as in the case with the field 2008.

The tint block application/non-application area information 308, which is determined using the setting areas 2250-2252, is stored in other field (not shown).

Print-Data Generating Process of Tint Block Image

Figure 17:
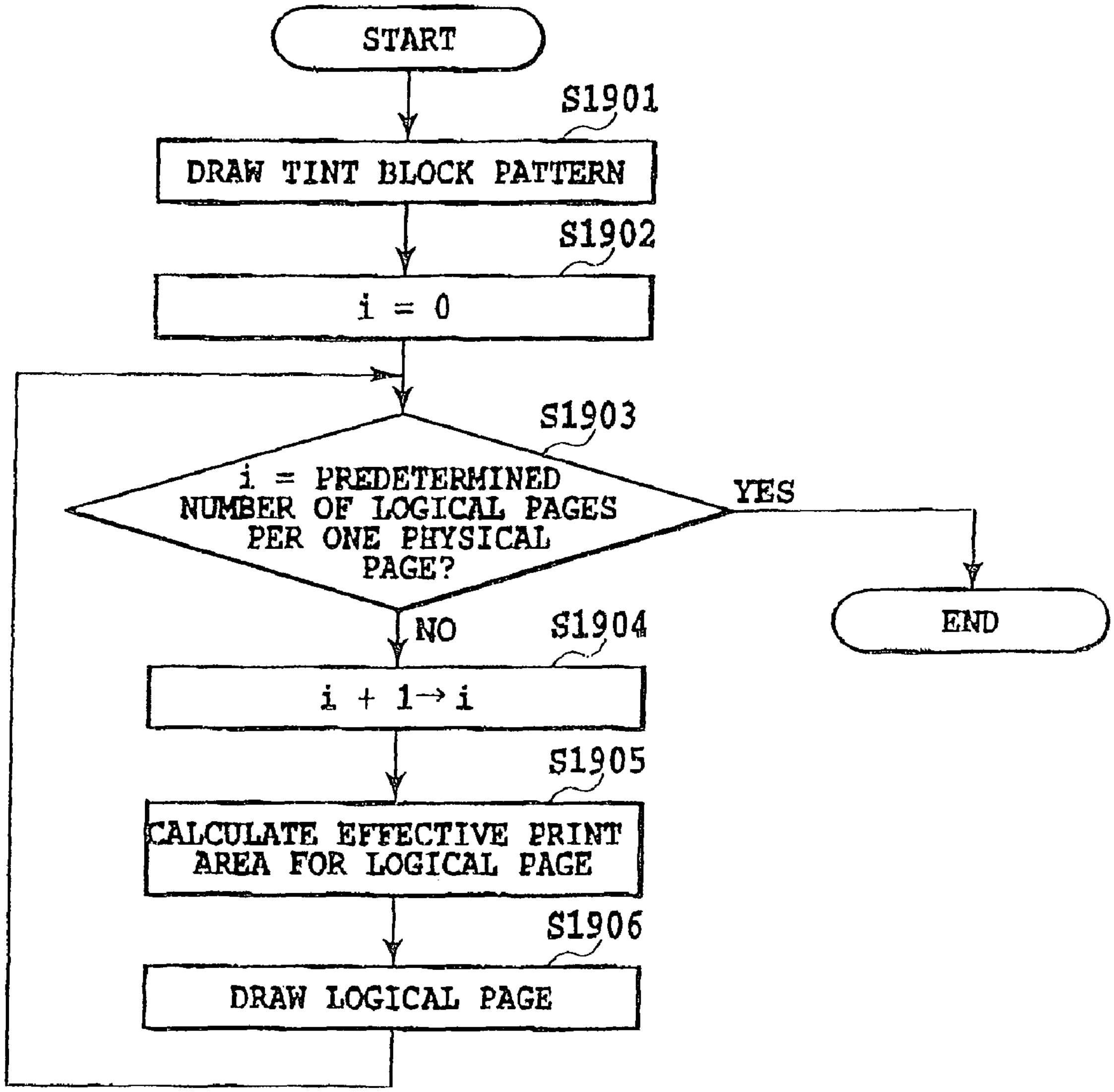
FIG. 17 is a flowchart showing one example of a drawing process of a tint block pattern.
Figure 18:
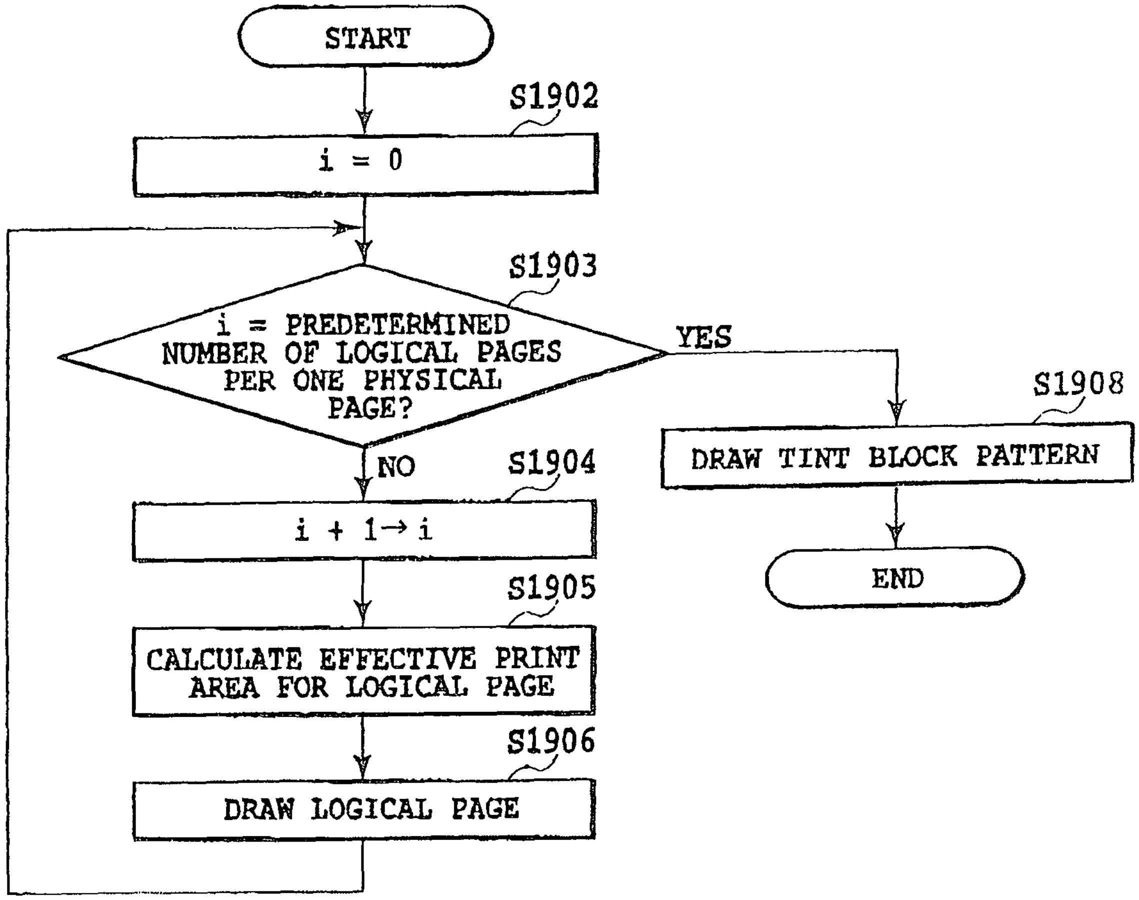
FIG. 18 is a flowchart showing another example of a drawing process of the tint block pattern.

FIG. 17 and FIG. 18 are flowcharts showing a flow of print-data generating process of the tint block image in the tint block printing. These figures correspond to "watermark printing" and "superposition printing" explained in FIG. 16A, respectively. These processes are performed in the course of the print processing in Step 708 of FIG. 6, i.e., in the print data generating process.

First, "watermark printing," i.e., a case where print data of the tint block image is generated in advance will be described using the flowchart of FIG. 17. As described above, watermark printings is a process of rasterizing the original data over the tint block image data in bit map memory of a printer. Therefore, the order of generation of print data is such that the print data of the tint block image is generated prior to generation of the print data corresponding to the original data.

In Step 1901, the tint block processing section 205 generates a tint block image according to information on the tint block shown in FIG. 14 The detailed processing will be described later with reference to FIG. 19. Then, a print-data generating process of the manuscript data is performed. The counter is initialized in Step 1902. In Step 1903, it is determined whether the counter indicates the number of logical pages per physical page previously set. If it becomes equal to the number of logical pages, this processing is finished; if it is not equal, the flow proceeds to Step 1904. The counter is incremented by unity in Step 1904. In Step 1905, an effective print area for logical pages for which the print-data generating process will be preformed after this based on the number of logical pages per physical page and the counter. In Step 1906, the current logical page number is read using the counter as an index based on information on the physical page informed in the format as FIG. 11, and pertinent logical pages are reduced in size so as to fit into the effective print area. However, if the N-page printing is not specified, naturally there is no necessity for reduction.

Next, a case of "superposition printing," that is, a case where print data of the manuscript data is generated in advance will be described using the flowchart of FIG. 18. As described above, "superposition printing" is a process of rasterizing the tint block image on the manuscript data in the bit map memory of the printer. Therefore, the order of generation of print data will be such that print data corresponding to the manuscript data is generated prior to generation of print data corresponding to the tint block image.

The counter is initialized in Step 1902. Next, in Step 1903, it is determined whether the counter becomes the number of logical pages per physical page previously set. If it becomes equal to that number of logical pages, the flow proceeds to Step 1908; if it is not equal, the flow proceeds to Step 1904. The counter is incremented by unity in Step 1904. In Step 1905, an effective print area for logical pages that will be generated after this is calculated based on the number of logical pages per physical page and the counter. In Step 1906, the current logical page number is read using the counter as an index based on information about the physical page notified in the form as of FIG. 11, and pertinent logical pages are reduced in size so as to fit in the effective print area. However, if the N-page printing is not specified, naturally there is no necessity for reduction. When the print data corresponding to the predetermined number of logical pages as one physical page has been generated, the flow proceeds to Step 1908. In Step 1908, the tint block processing section 205 generates the tint block image according to the information on the tint block shown in FIG. 14 based on the effective print area of the physical page acquired from the application. The detailed processing will be described later with reference to FIG. 19.

An explanation will now be given for the generation of a foreground and background area identification image that is used for drawing a tint block image, which will be described in detail later while referring to FIG. 19.

The foreground and background area identification image is information for distinguishing a foreground area from a latent image area, and is, for example, a binary (1 bit for each pixel) image in which the foreground is represented by 0s and the latent area is represented by 1s. Further, the foreground and background area identification image is formed by arranging basic blocks for this image in an area equivalent to the size of an output sheet.

FIG. 20A is a diagram showing an example of the basic block. The shown example of the basic block for the foreground and background area identification image is an example in the case that "character string" is selected in an area 2206 (a logo type) in FIG. 16A; "VOID" is selected in an area 2207 (a character string); and "horizontal" is selected in an area 2211 (an angle). When "image" is selected in the area 2206 in FIG. 16A, and an image file is selected in an area 2215 (a file name) as shown in FIG. 16B, the specified image file, or a binary image of this file is employed as the basic block for the foreground and background area identification image.

FIG. 20B is a diagram showing a foreground and background area identification image when the basic blocks are arranged in parallel. FIG. 20C is a diagram showing a foreground and background area identification image wherein the basic blocks are arranged so that they are shifted by one line from the arrangement in FIG. 20B. FIG. 20D is a diagram showing basic blocks of character string "VOID" when "right upward" is designated in the area 2211 (an angle) in FIG. 16A. FIG. 20F is a diagram showing a foreground and background area identification image when the basic blocks are arranged so that they are shifted by one line from the arrangement in FIG. 20D. When the foreground and background area identification image wherein the logos are obliquely arranged is employed, a tint block pattern, including obliquely arranged latent character strings or images, can be formed.

Figure 19:
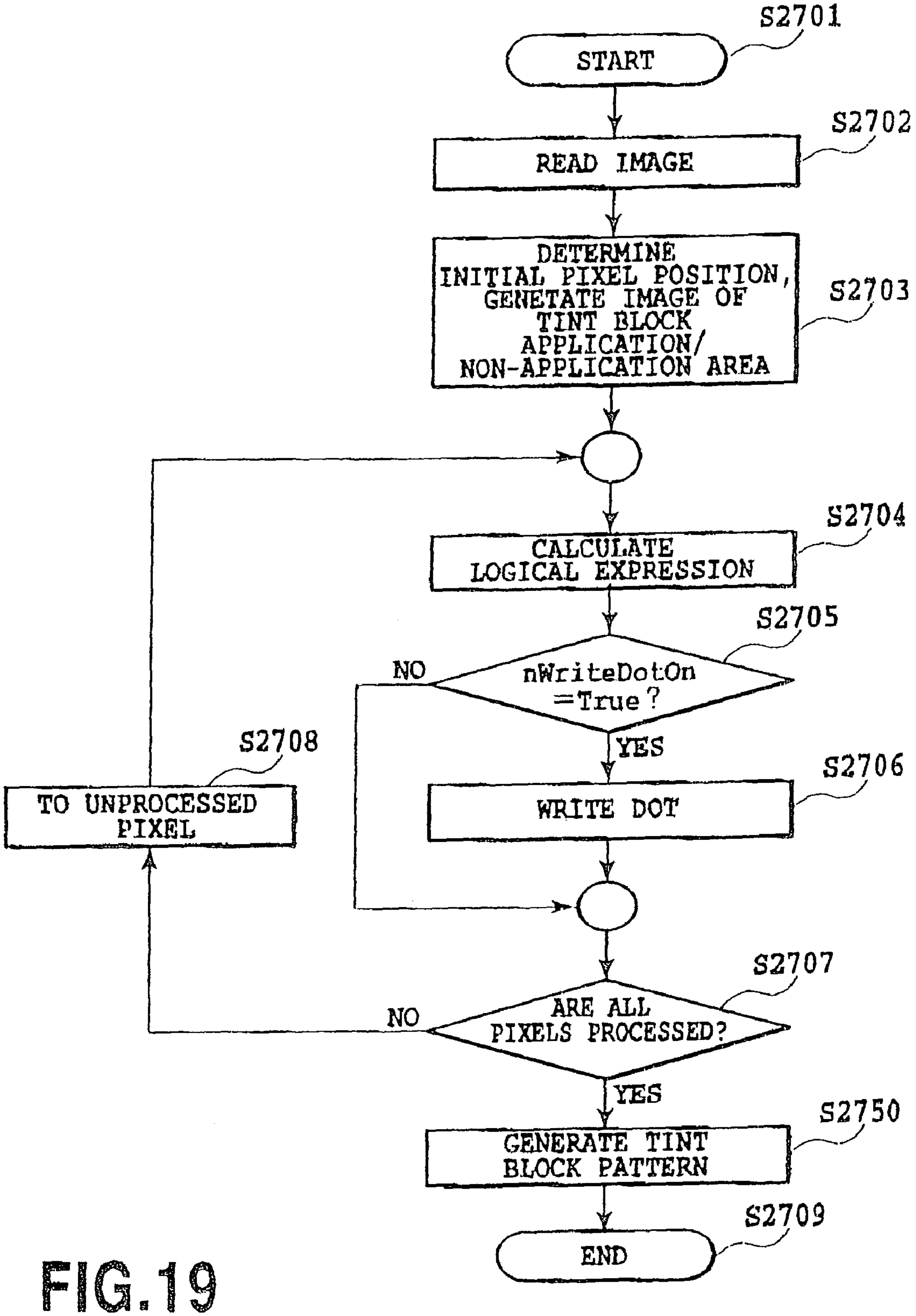
FIG. 19 is a flowchart showing steps of the drawing process of the tint block pattern.

FIG. 19 is a detailed flowchart showing the tint block pattern (tint block image) drawing process at S1901 in FIG. 17 and the tint block pattern drawing process at S1908 in FIG. 18. The tint block pattern drawing processing will now be described while referring to FIG. 19.

First, at step S2701, the tint block pattern drawing processing is initiated via the user interface. Then, at step S2702, an image (hereinafter referred to as an input background image) that is the base of a tint block image or a background image, a background threshold pattern, a foreground threshold pattern, the above described foreground and background area identification image, a camouflage area identification image and the tint block application/non-application area information are read. Further, at step S2703, the initial pixel location is determined for the generation of a tint block image. For example, when the image processing is performed for the entire input background image in the raster scanning order, from the upper left to the lower right, in order to change the image to the tint block image, the upper left location is defined as the initial location.

Furthermore, at step S2703, a tint block application/non-application area image is generated based on the tint block application/non-application area information 308 that has been read. The tint block application/non-application area image can be represented, for example, as a binary bitmap describing the entire face of sheet (a physical page), whereon the tint block application area is expressed by is and a non-application area is expressed by 0s. As a method for the generation of the tint block application/non-application area image, a bitmap indicating that the entire face of the sheet is a tint block application area (all pixels are 1) is generated, and a tint block non-application area is identified based on the tint block application/non-application area information 308, and is drawn using 0s. As another method, a bitmap indicating that the entire face of the sheet is a tint block non-application area (all pixels are 0s), and then a tint block application area is drawn using 1s.

Next, in Step 2704, the tint block processing section 205 performs processing to arrange the background threshold pattern, the foreground threshold pattern, the basic image, and the camouflage image in tiles on the tint block image area, starting from the upper left of that area, by calculation based on the following expression (1). By this calculation, it is determined whether a pixel value corresponding to a dot at the time of printing is written in the said pixel position. At this time, the pixel value corresponds to color information entered. Here, the background threshold pattern and the foreground threshold pattern are image data consisting of "1", and "0" that correspond to writing/unwriting of a dot. These images are data binarized by respective dither matrices suitable for forming the foreground (latent) image and the background image, respectively.

$$n\text{WriteDotOn}=n\text{Camouflage}\times(n\text{SmallDotOn}\times\neg n\text{HiddenMark}+n\text{LargeDotOn}\times n\text{Hiddenmark}) \quad (1)$$

The components of the expression are shown below.

nCamouflage: if an object pixel is a pixel that constitutes a camouflage pattern in a camouflage image, it assumes 0; if otherwise, 1.

nSmallDotOn: if the pixel value of the background threshold pattern is black, it assumes 1; if white, then 0 (color is not limited to this).

nLargeDotOn: if tile pixel value of the foreground threshold pattern is black, it assumes 1; if white, then 0 (color is not limited to this).

nHiddenMark: if a target pixel in the basic image is a pixel that constitutes the latent image, it assumes 1; if a pixel that constitutes the background image, it assumes 0.

¬nHiddenMark: Negation of nHiddenMark. It assumes 0 in the foreground section; and 1 in the background section.

Incidentally, it is not necessary to calculate the expression (1) by using all compositions therein for each pixel to be processed. Omission of unnecessary calculation can enhance the speed of processing.

For example, if nHiddenMark=1, then ¬nHiddenMark=0, and if nHiddenMark=0, then ¬nHiddenMark=1. Therefore, it is good to assume a value of the following expression (2) as a value of nLargeDotOn if HiddenMark=1, and to assume a value of the expression (2) as a value of nSmallDotOn if nHiddenMark=0.

Moreover, since a value of nCamouflage is a multiplicand to the terms in a parenthesis as shown in the expression (1), if nCamouflage=0, then nWriteDotOn=0. Therefore, if nCamouflage=0, calculation of the expression (2) below can be omitted.

$$(\text{nSmallDotOn}\times\neg\text{nHiddenMark}+\text{nLargeDotOn}\times\text{nHiddenMark}) \quad (2)$$

Furthermore, an image whose dimensions of length and breadth are least common multiples of lengths and breadths of the background threshold pattern, the foreground threshold pattern, the basic image, and tile camouflage image, respectively. Therefore, the processing time for generating the tint block image can be shortened if the tint block processing section 205 generates only one portion of the tint block image that is the minimum unit of repetition and arranges that portion of the tint block image repeatedly to tile the tint block image area completely.

Next, in Step 2705, the CPU 1 determines the calculation result (a value of nWriteDotOn) in Step 2704. That is, if nWriteDotOn=1, the flow proceeds to Step 2706; if nWriteDotOn=0, the flow proceeds to Step 2707.

At step S2706, the process is performed for writing pixel values that correspond to dots to be printed. The pixel values can be changed in accordance with the color of a tint block image. In the case of creating a black tint block image, processing object pixels of the input background image are set to be black. When cyan, magenta and yellow are set correspondingly to the toner or ink colors used in a printer, a colored tint block image can also be generated. Further, when the background image has image data consisting of one to several bits for each pixel, pixel values can be represented by using an index color method. The index color method is a method in which information for colors that frequently appear in an object color image is designated by an index (for example, index 0 may designate white, index 1 may designate cyan, and the like), and the value of each pixel is represented by using the number of the index wherein the color information is described (for example, a first pixel value may be represented as an index 1 value, and a second pixel value may be represented as an index 2 value).

At step S2702, a check is performed to determine whether all the pixels in the processing object area of the input background image have been processed When all the pixels in the object area of the input background image have not yet been processed, program control advances to step S2708 and the unprocessed pixels are selected. Thereafter, the processes at steps S2704 to S2706 are repeated.

At step S2750, for all the pixels, an AND operation is executed for the tint block application/non-application area image generated at step S2703 and the tint block image generated at steps S2704 to S2708, so that a tint block pattern is generated by taking into account the tint block application area or the tint block non-application area. More specifically, a tint block image is not printed in the area of a physical page (one page of a print sheet) that is specified as the tint block non-application area, even thought this area is an area to which the tint block image is originally to be printed.

As is described above, the previously described processing is performed for the input background image, so that a tint block image is created. In addition, through this processing, a block of dots would be formed at a portion whereat the foreground and the background are switched in the foreground and background area designation image, so that the outer edges of the foreground would become apparent, and the effects produced by the copy-forgery-inhibited pattern would be reduced. Therefore, a boundary process may also be performed to prevent the formation of a block of dots in the portion, in the foreground and background area specifying image, wherein the foreground and the background are switched.

Preview of Tint Block Printing

Figure 22:
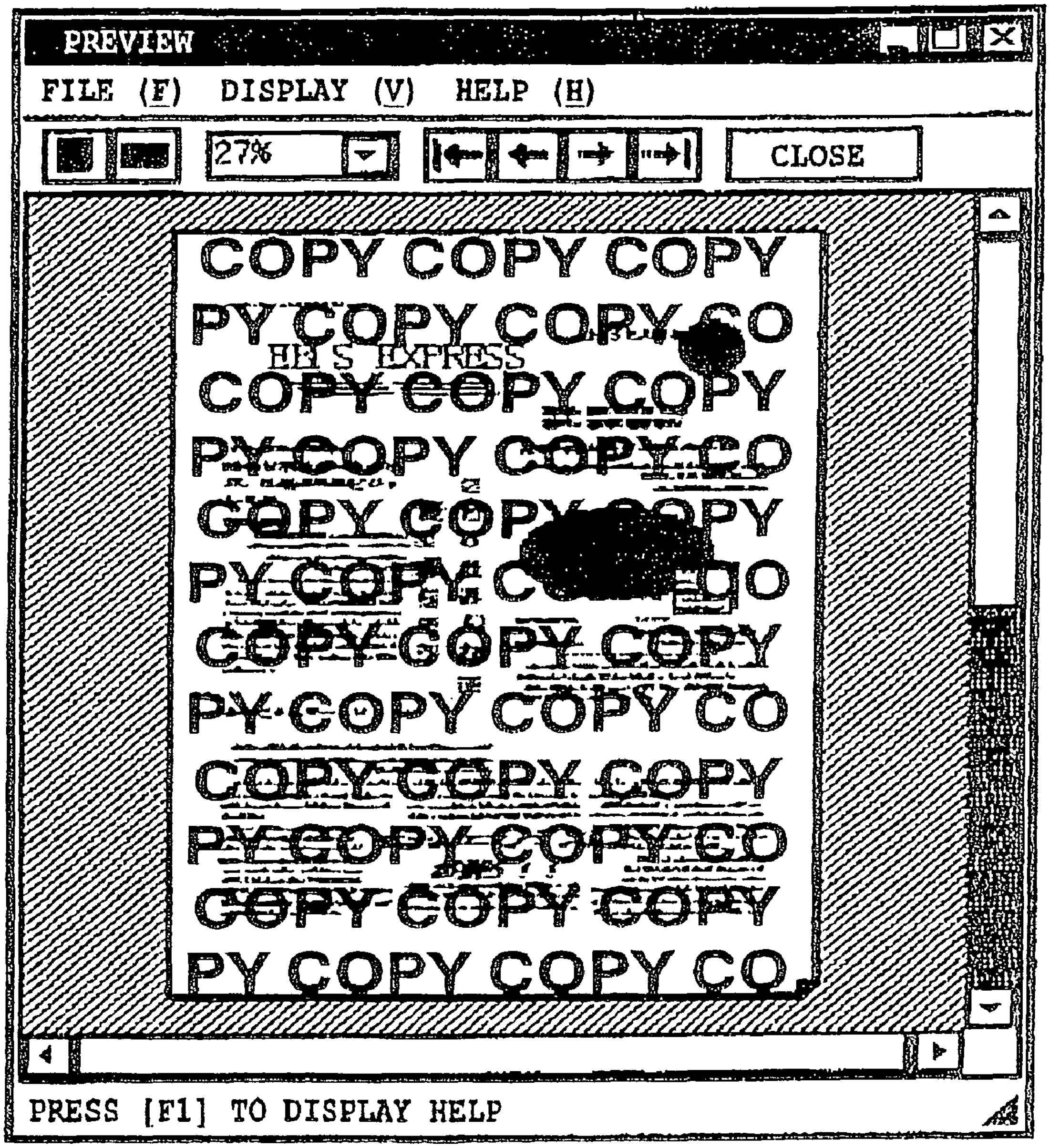
FIG. 22 is a view showing a display example of a tint block image in the previewer 306 of the embodiment.

FIG. 22 is a view showing a display example by the previewer 306 in which the tint block image is applied.

In a preferred embodiment, as described previously, the visualized tint block image after copying is displayed as is shown in FIG. 22, so that a user can easily recognize printing for the tint block. More specifically, the original image, which is required to be printed in a super imposed state with the tint block image, and is created through an application or the like, is displayed in a small dot (a background image) area, and an image having a color specified for tint block printing and a lowered density is located in a large dot (a latent image) area. In this regard, when "watermark printing" is selected in the printing method setting area 2210 in FIG. 16A, the visualized image for the preview is drawn prior to the drawing of the original image. And when "overlap printing" is specified, an OR operation is performed instead of the AND operation, to draw the visualized image for the preview on the original image. As a result, an image can be drawn and previewed that is similar to the image that is actually printed. In addition, a preview process other than the above described preview process for displaying the tint block image visualized by copying may include a preview process in which a latent image has a density so that the latent image is visible in relation to a background image and respective latent and background images are seen through the original image.

In this embodiment, the previewer 306 can be employed to provide the third construction related to the specifying of a tint block application area or a tint block non-application area.

According to the third construction, the tint block application/non-application area information 308 is set or updated, by the user's operation using the previewer 306. Further, the tint block application area or the tint block non-application area, which is specified by the first or the second construction as previously described, can be seen in a superimposed state with the original image and confirmed on the display provided by the previewer 306, and can also be corrected in accordance with the confirmation.

Figure 23:
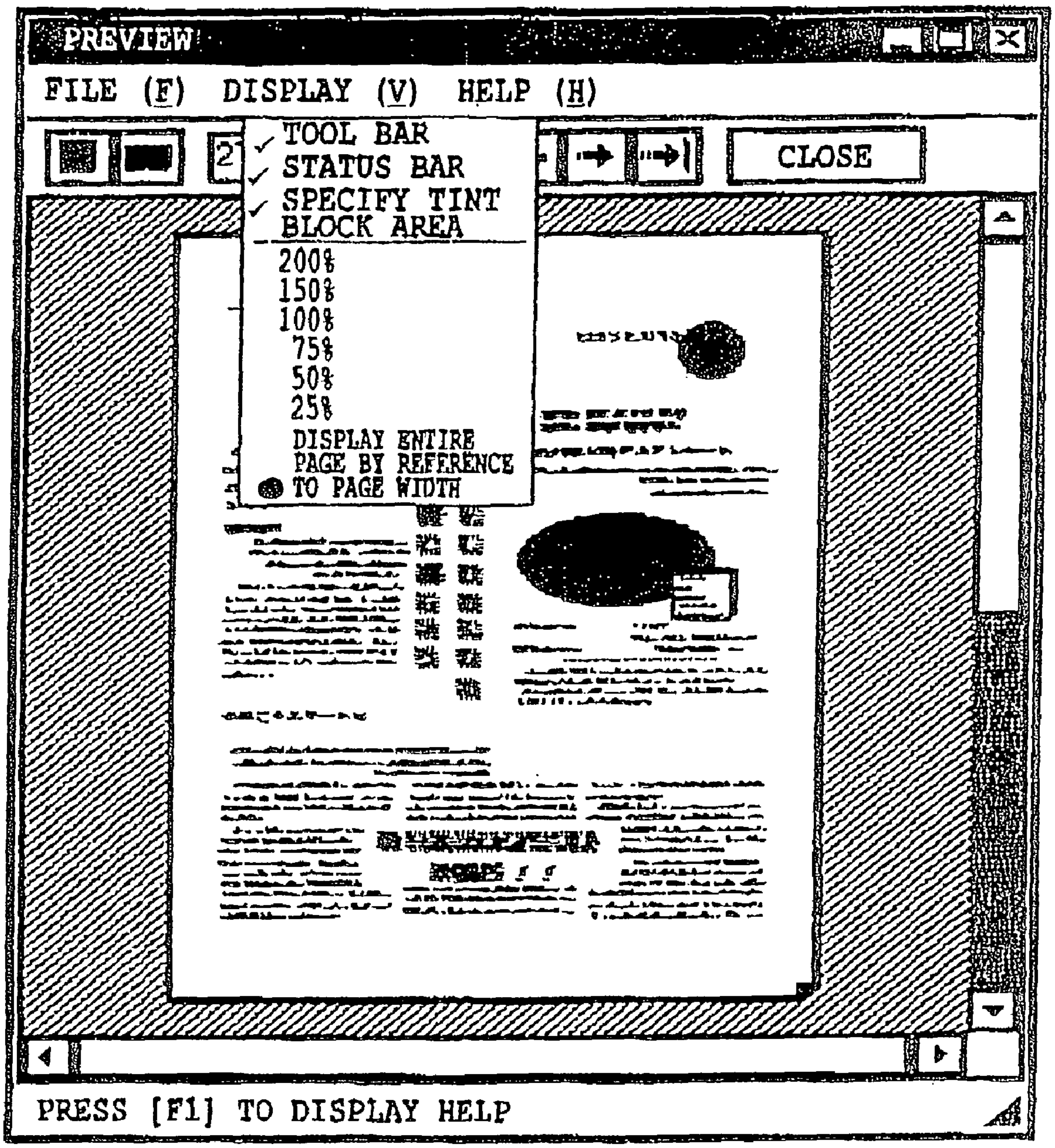
FIG. 23 is a view showing a display example of a tint block image and a menu in the previewer 306 of the embodiment.
Figure 24:
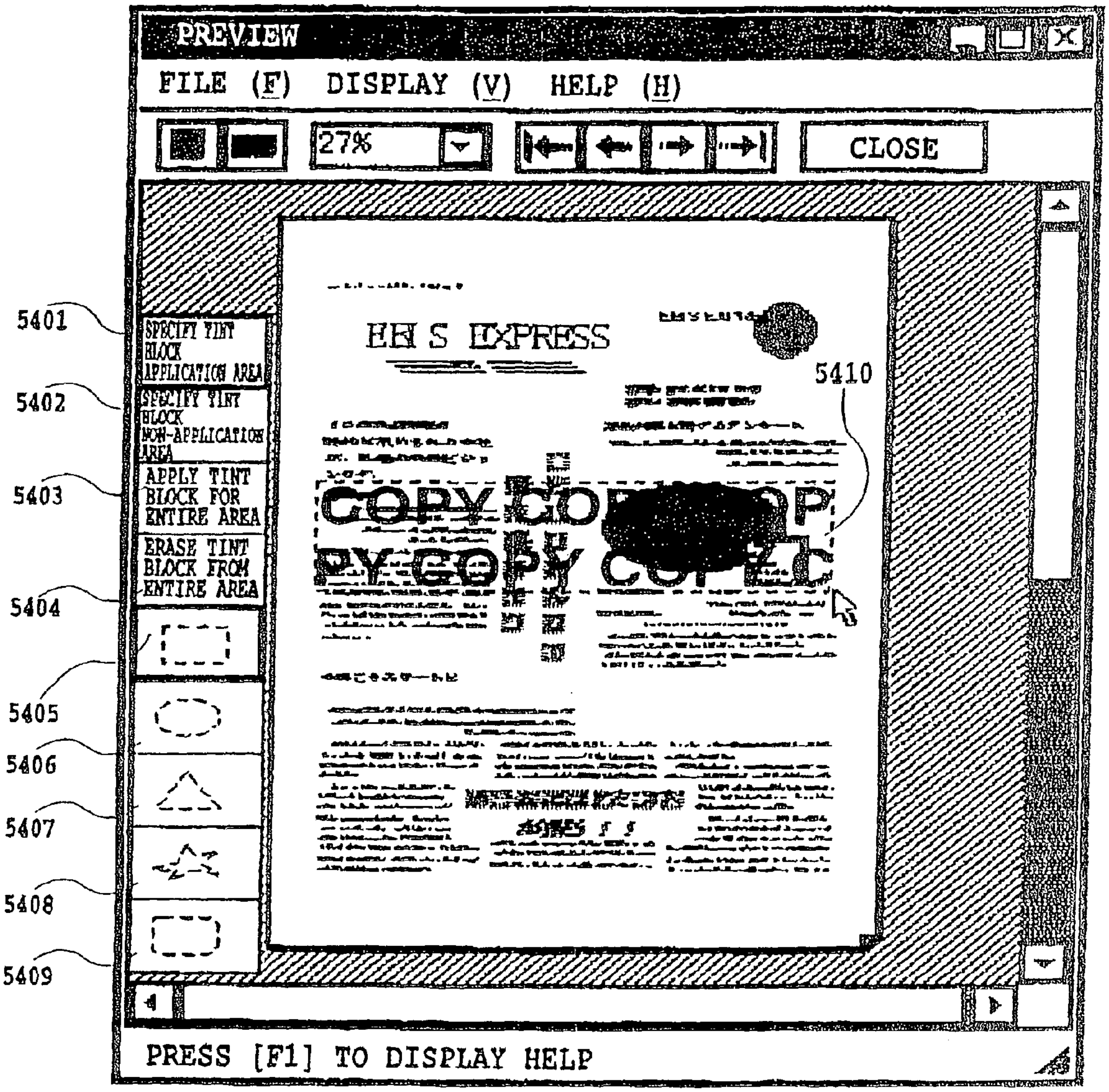
FIG. 24 is a view showing control buttons for specifying an application area or non-application area for a tint block image and a display example of an area specified through the control buttons, in the previewer 306 of the embodiment.

In this embodiment, as is shown in FIG. 23, a "specify a tint block area" item 5301 is provided on the "display" menu of the previewer 306. When a user selects this item, as is shown in FIG. 24, the individual control buttons for specifying a tint block area are displayed. In the example in FIG. 22, the visualized tint block image for the preview is displayed in the initial display state, but FIG. 23 shows the case that the tint block image for the preview is not displayed for the initial display state.

In FIG. 24, control buttons 5401 to 5409 are tools used to specify a tint block area, and are selected by the user. The display states represented by these buttons are changed, depending on the selected and the non-selected states, so as to present the current states for the user. In the example in FIG. 24, the "tint block use area specifying" button 5401 and the "rectangular area specifying" button 5404 have been selected, and are enclosed by thick outer frames to notify the user that these are the currently selected buttons. As a matter of course, any method may be employed which can show the selected state of the control button.

Of the control buttons 5401 to 5409 in FIG. 24, the "tint block application area specifying" button 5401 is used to change the tint block editing mode to an "application mode", and the "tint block non-application area specifying" button 5402 is a tool for changing the tint block editing mode to a "non-application mode". These two buttons are exclusively selected, and in the initial state, one of them is selected.

Next, the "all tint block application area specifying" button 5403 is a button for specifying the entire previewed page area as a tint block application area. By pressing this button, the preview tint block on the display is changed to the state shown in FIG. 22, wherein a tint block is applied. On the other hand, "all tint block non-application area specifying" button 5404 is a button for specifying the entire previewed page area as a tint-block non-application area. When this button is selected, the preview tint block on the display is changed to the state shown in FIG. 23, wherein a tint block is not applied.

The buttons 5404 to 5409 are tools for specifying the shapes of the tint block application area and a tint block non-application area, and in this embodiment, a rectangle, an ellipse, a triangle, a polygon, and a rectangle of rounded shoulder can be specified. As a matter of course, the shape pother than these shapes may be employed. When one of the shape setting buttons 5404 to 5409 is selected, a figure in accordance with the selected shape is displayed on the page preview as shown in an area 5410. Then, while taking into account the positional relationship between this figure and the original image and the purpose for which a tint block is used, the user changes the size of the figure or moves the location of the figure so as to specify the tint block application area or a tint block non-application area.

In this embodiment, when a polygon is selected as the shape of the area, because of the property of this figure, the user is requested to use a mouse to enter the individual points for the polygon, and these points are linearly connected in the order in which the individual points are specified. In the case of the tint block application mode selected by the "tint block application area specifying" button, a visualized image for a preview is displayed on the page preview. Whereas when the non-application mode is selected by the "tint block non-use area designation" button, only the original image is displayed.

The user operates the above described control buttons to repeat the specifying of the area and the location and the size thereof, so that the preview screen, i.e., the tint block application area or the tint block non-application area can be updated, and the optimal area can be interactively selected. As a matter of course, also in this embodiment, a plurality of tint block application/non-application areas can be specified similarly to the second construction. Further, multiple original images may be displayed in synchronization with the operation for specifying the tint block application area or the tint block non-application area. Then, the operation for editing the tint block area can be repeated, while taking into account the relationship between the individual original images and the tint block image, so that a tint block image that is appropriate for the individual original images and is desired by a user can be edited.

When the user employs the above described functions and specifies layouts to set multiple tint block application areas, the process for specifying areas is supervised so that the layouts are not overlapped. When the user specifies tint block application areas that will be overlapped, a warning message is displayed, or a process is performed for automatically returning the layouts to locations whereat overlapping is prevented. This function can be performed by not only by the third construction, but also by the first or the second construction.

FIGS. 25A to 25D are diagrams showing display examples provided by the previewer.

Figure 25A:
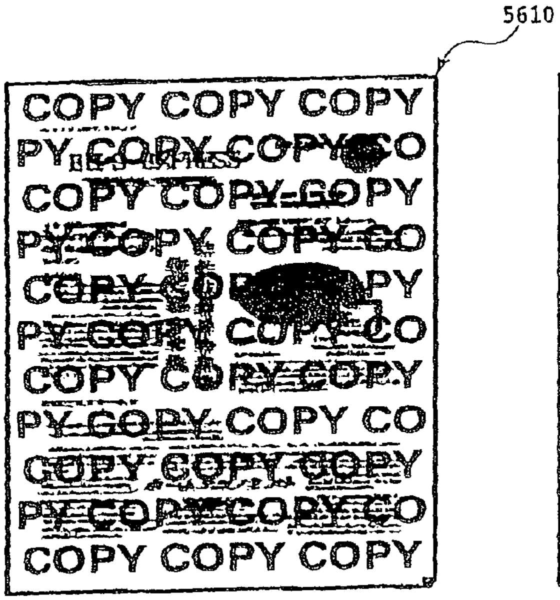
FIGS. 25A-25D are views showing conditions specified through the buttons shown in FIG. 24 on the previewer.
Figure 25B:
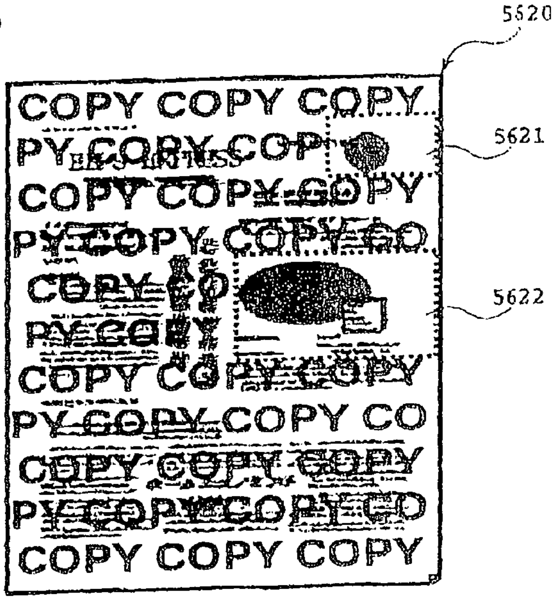

A display example 5610 in FIG. 25A is an example wherein an entire physical page is specified as the tint block application area, i.e., in FIG. 25A, the entire area of the physical page displayed on the preview is the tint block application area. In FIG. 25B is shown a display example 5620 wherein the "non-application mode" is selected in the state shown in FIG. 25A, and two rectangular areas 5621 and 5622 are specified by using the rectangular area specifying button 5405. In this case, only the original image is displayed inside the two rectangular areas 5621 and 5622.

Figure 25C:
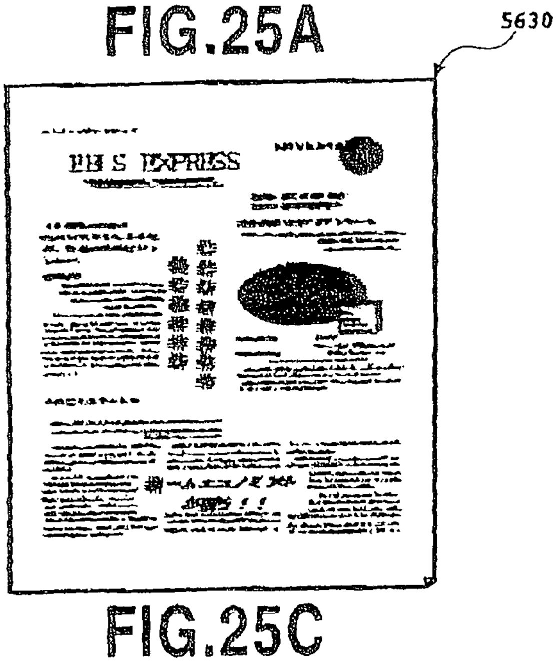
Figure 25D:
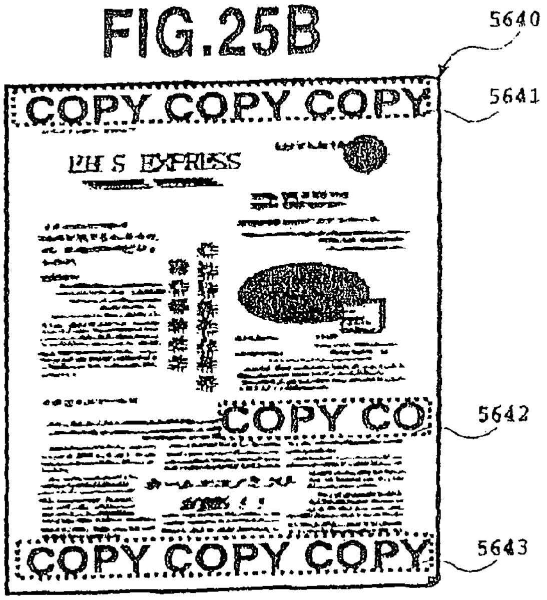

A display example 5630 in FIG. 25C is an example wherein the entire page area is specified as a tint block non-application area, i.e., the entire area of the physical page displayed on the preview is the tint block non-application area. A display example 5640 in FIG. 25D is an example wherein the "application mode" is selected in the state in FIG. 25C, and then three rectangular areas 5641, 5642 and 5643 are specified by using the rectangular area specifying button 5405. The state wherein the tint block is employed is shown inside the individual rectangular areas 5641, 5642 and 5643.

As is described above, the information edited by the user for the tint block application area or the tint block non-application area is stored as the tint block application/non-application area information 308, and as was described for the "tint block pattern drawing processing", the despooler 305 refers to this information 308 during the tint block pattern drawing processing, and the tint block pattern edited by the user is generated and printed.

The method for designating the tint block use area or the tint block non-use area on the preview screen is not limited to the method that uses the previewer 306, and the setup change editor 307 may be employed for the specifying.

In addition, for the above described specifying of the tint block application area or the tint block non-application area, the display state of the previewer is not limited to the above described example. For example, the printing state, i.e., the state wherein a latent image portion is not rendered visible by copying, maybe displayed, and the application area or the non-application area may be specified by referring to this state.

Figure 26C:
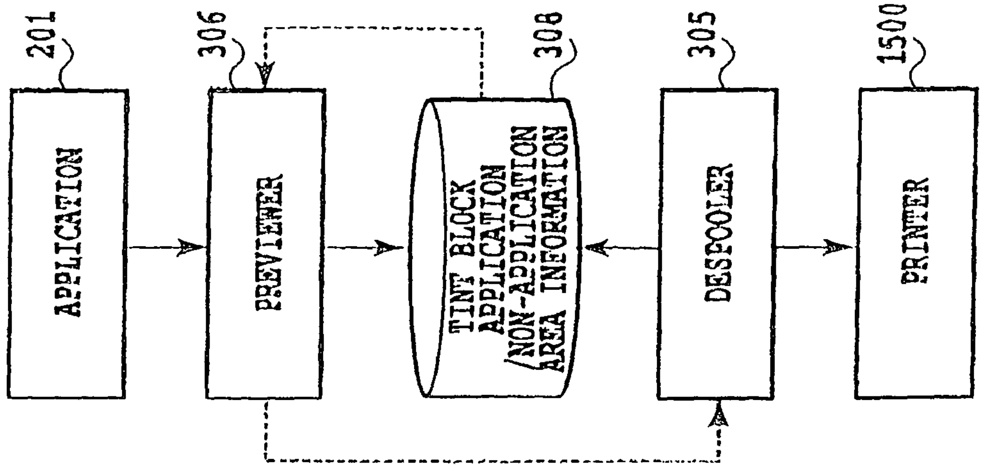
FIGS. 26A-26C are block diagrams showing three constructions for processing flows each of which centers tint block application area non-application area information, according to an embodiment of the invention.
Figure 26B:
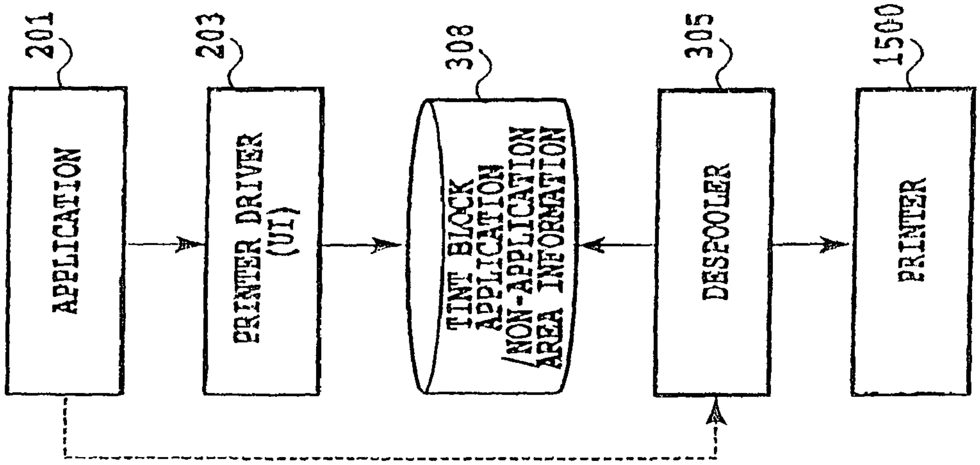
Figure 26A:
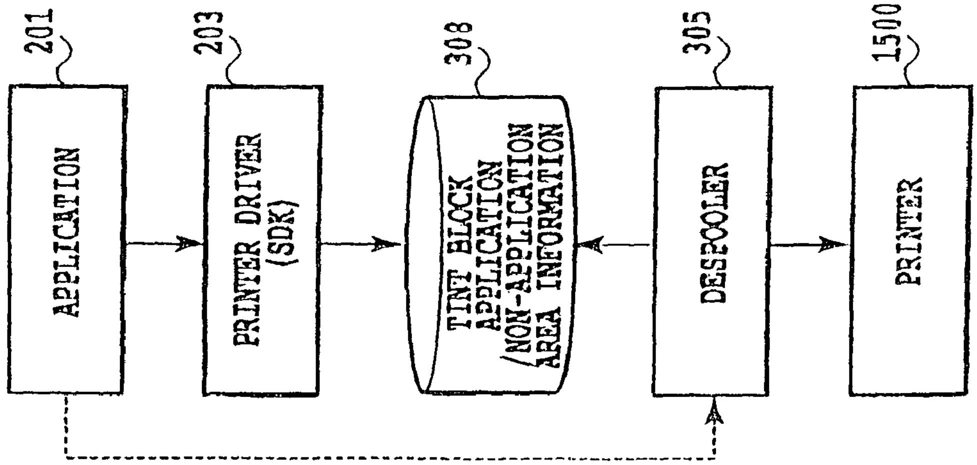
Figure 27:
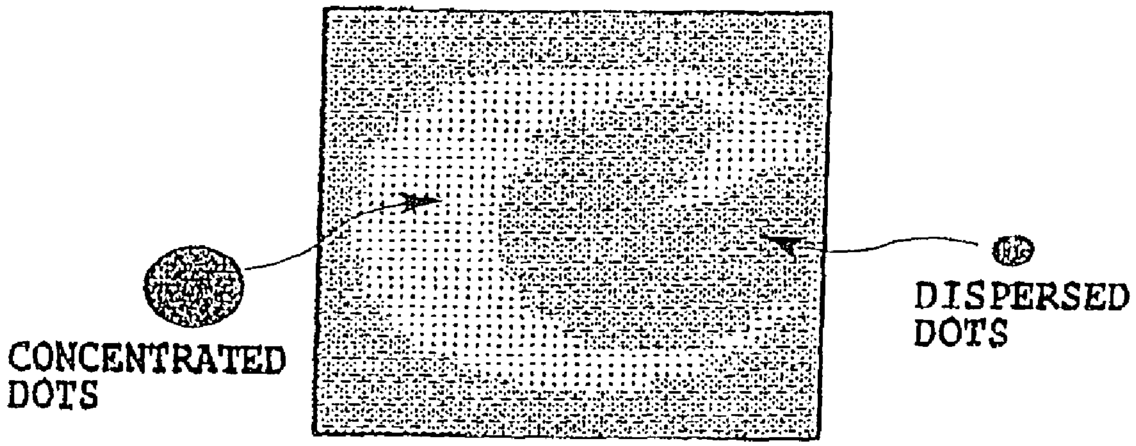
FIG. 27 is view showing a latent image portion and a background portion both of which are two areas of a tint block image.
Figures 28A, 28B:
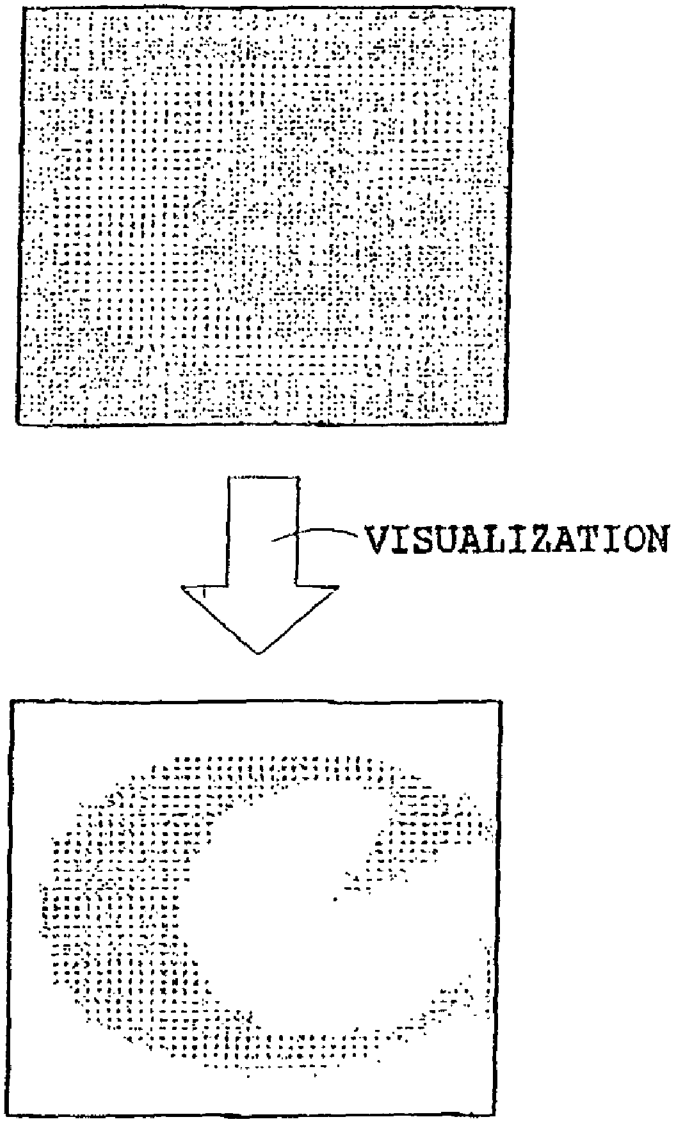
FIGS. 28A and 28B are views for explaining a visualization of a tint block image.
Figure 29A:
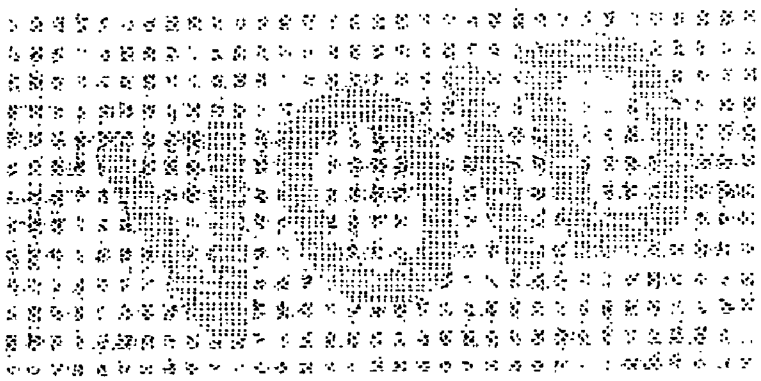
FIGS. 29A and 29B are views showing a camouflage for a tint block image.
Figure 29B:
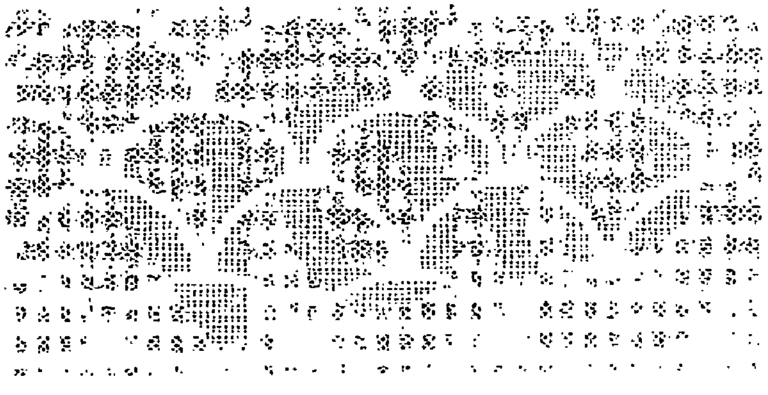

FIGS. 26A to 26C are block diagrams showing the processing performed by the three individual constructions that employ the tint block application/non-application area information 308 to specify the tint block application area or the tint block non-application area.

FIG. 26A shows the processing flow performed by the first construction. As is shown in FIG. 26A, the application 201 calls the special interface for the printer driver 203 directly, and generates the tint block application/non-application area information 308. In this regard, for this application, the user has already set the tint block application area or the tint block non-application area. The application 201 also issues a printing instruction, and transfers program control to the despooler 305 via the path explained while referring to FIG. 3. The despooler 305 examines the tint block application/non-application area information 308 to generate print image data to which an appropriate tint block pattern is attached. The obtained print image data are transmitted to the printer 1500 via the path explained while referring to FIG. 3, and printing results can be obtained in which the tint block application area and non-application area specified by the application are reflected.

FIG. 2613 shows the process f low performed by the second construction. The user employs the application 201 or the OS to call the UI setup screen of the printer driver 203. Through user operation on this screen, the tint block application/non-application area information 308 is generated. Then, as in the first construction, program control is shifted to the despooler 305, which outputs image data to the printer 1500. As a result, printing results can be obtained in which the tint block use area and the tint block non-use area designated by the user on the UI setup screen are reflected.

FIG. 26C shows the process flow performed by the third construction. First, a print job indicating "edit & preview" is issued, and program control is shifted to the previewer 306. After the preview screen is displayed, the user performs an operation to generate the tint block application/non-application information 308, while confirming the original image. The tint block application/non-application information 308 determined by the user is examined by the despooler 305, as in the first and the second constructions, and image data are generated that include an appropriate tint block pattern. The image data are thereafter output to the printer 1500 via the path explained while referring to FIG. 3, so that printing results can be obtained in which the tint block use area and the tint block non-use area, designated by the user on the preview screen, are reflected.

As previously described, these three constructions may either be independently employed, or several of them may be employed, e.g., the first or the second construction may be employed first, and then the third construction may be employed.

In the embodiment described above, the tint block application area or the tint block non-application area has been simply specified on a physical page. However, the present invention is not limited to this example. For example, as explained while referring to FIG. 16A and FIGS. 20A to 20F, the location of the foreground (latent image) on the physical page can be determined through the operation for specifying the foreground and background area specifying image. In this case, the positional relationship between the foreground and the tint block application area or the tint block non-application area differs, depending on the respective locations of the foreground shown in FIG. 20B, FIG. 20C, FIG. 20E, 20F. That is, when the location of the foreground is changed, the positional relationship between the tint block image and the original image is also changed, even though the same tint block application area, or the same tint block non-application area, is specified. The scope of the present invention includes not only the configuration wherein the tint block application area or the tint block non-application area is specified while the location of the foreground is fixed, but also the configuration for specifying both the location of a tint block image, such as a foreground, and the tint block application area or the tint block non-application area, as explained in the embodiment, i.e., the configuration of the relative specifying of the tint block application area or the tint block non-application area. Specifically, after an area is specified by the first or the second construction, in the same manner as one is specified by the third construction via the previewer, the operation for setting the foreground and background area specifying image is performed by using a dialogue box shown in FIG. 16A, while the locations of the original image and the tint block image are confirmed by using the previewer. As a result, the location of the foreground relative to the specified area can be changed, and an optimal area can be specified.

Furthermore, in the embodiment described above, multiple tint block application areas can be specified for a single physical page, on the assumption that the same tint block image is employed for these areas. However, the present invention is not limited to this, and the setup of the individual tint blocks can be varied., For example, two tint block use areas may be specified, and a character string "COPY" may be selected for the first area, while a character string "user name" is selected for the second area. Of course, the tint block to be selected may not only be a different character string, but may also include various other setups, such as the color, watermark printing/overlap printing, the angle, whether or not solid white is used, the use or non-use of camouflage, and the pattern to be employed.

The embodiments described above employ the constructions that specify the tint block application area or the tint block non-application area on one page of the physical page. However, original data created by an application is not necessarily printed on one page of the physical page. That is, there also is a case that it is desired to specify and change the tint block application area or the tint block non-application area for each page of multiple pages. Further, it also is desired that specifying the area is executed only for a particular page and the tint block application or the tint block non-application is executed to an entire page for other pages. Consequently, in order to enable an effective setting the area in the above described second and third constructions, items, through which a user can specify "reflect a tint block application (non-application) area specifying on all pages" or "reflect a tint block application (non-application) area specifying on current page", may be provided Then, selecting the items enables the user to specify the tint block application area or the tint block non-application area for each physical page. These items can be realized by for example adding them to the menu shown in FIG. 24. As a matter of course, when the original data is printed on only one page, the above items are controlled not to be displayed. Further, when the user wants to select "reflect a tint block application (non-application) area specifying on current page", it may be possible to execute arbitrary area specifying for each of other pages and store the specified information for each page as the tint block application/non-application area information 308. This enables an arbitrary tint block image to be generated. Furthermore, when the user wants to select "reflect a tint block application (non-application) area specifying on current page", it may be possible to inform and cause the user to execute area specifying for other pages. This enables a usability to be improved.

Another Embodiment

Incidentally, the present invention may be applied to a system comprising two or more pieces of equipment (for example, host computer, interface device, reader, printer, etc.), and to equipment consisting of a single device (copying machine, printer, facsimile apparatus, etc.).

In addition, the object of the present invention is also achieved by allowing a computer in a system or equipment (or CPU, or MPU) to read and execute program code stored in a storage medium for storing program code that executes procedures of the flowcharts realizing the above-mentioned functions of the embodiment and being shown in FIGS. 4-6 and FIGS. 17-19.

In this case, the program code itself read from the storage medium will realize the above-mentioned functions of the embodiments, and consequently the storage medium storing the program code constitutes the present invention.

As storage media for providing the program code, there can be used, for example, a floppy (registered trademark) disk, a hard disk, an optical disk, a magneto-optical disk, CD-ROM, CD-R, magnetic tape, a nonvolatile memory card, ROM, etc.

Moreover, the present invention includes not only a case where the above-mentioned functions of the embodiments are realized by a computer executing read program code, but also a case where the OS (Operating System) working on a computer executes a part or the whole of actual processing based on instructions of the program code, by which processing the above-mentioned functions of the embodiments are realized.

Furthermore, the present invention also includes a case where the program code read from the storage medium is written into memory possessed by a function expansion board loaded into a computer or by a function expansion section connected to a computer, and subsequently, based on instructions of the program code, a CPU possessed by the function expansion board or by the function expansion section or etc. executes a part or the whole of actual processing, by which processing the above-mentioned functions of the embodiment are realized.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application Nos. 2004-016398 filed, Jan. 23, 2004 and 2005-008186 filed Jan. 14, 2005,which are hereby incorporated by reference herein.

What is claimed is:

1. An information processing apparatus for generating an image to be added to an original, the image including a character which is hardly recognizable when the image is printed on a medium and is recognizable when the image printed on the medium is duplicated, said apparatus comprising:

receiving means for receiving an input by a user for specifying an image non-application area in one physical page; and generating means for generating, the image to be added to the original, so that the image is excluded from the image non-application area specified by the input received by said receiving means.

2. An information processing apparatus as claimed in claim 1, further comprising preview means that displays an image based on a print image to which one physical page of the generated image is added, wherein said receiving means operates as a constituent part of said preview means.

3. An information processing apparatus as claimed in claim 1, wherein said generating means generates the image to be added to the original (i) using a binary image expressing the image non-application area as 0s and an area excluding the image non-application area as 1s; and (ii) by executing an AND operation between the binary image and an image that corresponds in size to one output sheet and includes a character that is hardly recognizable when the image is printed on a medium and is recognizable when the image printed on the medium is duplicated.

4. An information processing apparatus as claimed in claim 3, further comprising:

displaying means for displaying a visualized generated image in the area excluding the image non-application area, the visualized generated image being a representation of a copy produced by copying an original to which the generated image has been added.

5. An information processing apparatus as claimed in claim 1, further comprising:

adding means for rasterizing the original over the generated image or rasterizing the generated image over the original;

wherein whether the generated image is rasterized over the original or under the original is determined based on information input by a user through said receiving means.

6. An information processing method for generating an image to be added to an original, the image including a character which is hardly recognizable when the image is printed on a medium and is recognizable when the image printed on the medium is duplicated, said method comprising the steps of:

receiving an input by a user for specifying an image non-application area in one physical page; and generating the image to be added to the original, so that the image is excluded from the image non-application area specified by the input received in said receiving step.

7. An information processing method as claimed in claim 6, further comprising a step of providing preview means that displays an image based on a print image to which one physical page of the generated image is added, wherein said receiving step functions as a constituent part of said preview means to receive the input.

8. A program embodied in a computer-readable medium for causing a computer to function as an information processing apparatus for generating an image to be added to an original, the image including a character which is hardly recognizable when the image is printed on a medium and is recognizable when the image printed on the medium is duplicated, said apparatus comprising:

receiving means for receiving an input by a user for specifying an image non-application area in one physical page; and generating means for generating the image to be added to the original, so that the image is excluded from the image non-application area specified by the input received by said receiving means.

9. A printing system for printing an original and an image added to the original, the image including a character which is hardly recognizable when the image is printed on a medium and is recognizable when the image printed on the medium is duplicated, said system comprising:

receiving means for receiving an input by a user for specifying an image non-application area in one physical page;

generating means for generating the image to be added to the original, so that the image is excluded from the image non-application area specified by the input received by said receiving means; and printing means for printing the original and the image added to the original onto the medium.

* * * * *